US008587878B2

(12) United States Patent
Ohashi et al.

(10) Patent No.: US 8,587,878 B2
(45) Date of Patent: Nov. 19, 2013

(54) IMAGE-FORMING LENS, AND IMAGING APPARATUS AND INFORMATION DEVICE USING THE IMAGE-FORMING LENS

(71) Applicants: Kazuyasu Ohashi, Funabashi (JP); Takashi Kubota, Suginami-ku (JP)

(72) Inventors: Kazuyasu Ohashi, Funabashi (JP); Takashi Kubota, Suginami-ku (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/803,112

(22) Filed: Mar. 14, 2013

(65) Prior Publication Data
US 2013/0194681 A1 Aug. 1, 2013

Related U.S. Application Data

(62) Division of application No. 13/167,368, filed on Jun. 23, 2011.

(30) Foreign Application Priority Data

Jun. 24, 2010 (JP) ................................ 2010-144335
Jul. 30, 2010 (JP) ................................ 2010-172422

(51) Int. Cl.
G02B 13/04 (2006.01)
(52) U.S. Cl.
USPC ........................................................ 359/753
(58) Field of Classification Search
USPC ........................ 359/749–753, 691, 793, 794
See application file for complete search history.

(56) References Cited

U.S. PATENT DOCUMENTS

| 5,398,135 | A | 3/1995 | Ohashi |
| 5,576,891 | A | 11/1996 | Ohashi |
| 5,617,254 | A | 4/1997 | Ohashi |
| 5,666,228 | A | 9/1997 | Yamamoto |
| 6,058,269 | A | 5/2000 | Tsutsumi |
| 6,353,506 | B1 | 3/2002 | Ohashi |
| 6,525,885 | B2 | 2/2003 | Ohashi |
| 6,771,433 | B2 | 8/2004 | Ohashi |

(Continued)

FOREIGN PATENT DOCUMENTS

EP   1 975 664 A1   10/2008
EP   2 090 916 A1   8/2009

(Continued)

OTHER PUBLICATIONS

U.S. Appl. No. 13/803,262, filed Mar. 14, 2013, Kubota, et al.

(Continued)

Primary Examiner — Alessandro Amari
Assistant Examiner — Jie Lei
(74) Attorney, Agent, or Firm — Oblon, Spivak, McClelland, Maier & Neustadt, L.L.P.

(57) ABSTRACT

An image-forming lens consists of: from an object side to an image side in the following order, a first lens group with a positive refractive power; an aperture stop; and a second lens group with a positive refractive power, and the second lens group includes: from the object side to the image side in the following order, a second F lens group with a positive refractive power in which a biconvex lens and a biconcave lens are cemented to each other; a second M lens group having a concave shape on a surface on a most object side and a convex shape on a surface on a most image side; and a second R lens group of a positive lens.

19 Claims, 20 Drawing Sheets

(56) References Cited

U.S. PATENT DOCUMENTS

| | | |
|---|---|---|
| 6,829,102 B2 | 12/2004 | Ohashi et al. |
| 6,839,183 B2 | 1/2005 | Ohashi |
| 6,839,185 B2 | 1/2005 | Ohashi |
| 6,995,921 B2 | 2/2006 | Ohashi |
| 7,151,638 B2 | 12/2006 | Ohashi |
| 7,164,542 B2 | 1/2007 | Ohashi |
| 7,324,293 B2 | 1/2008 | Kato |
| 7,580,200 B2 | 8/2009 | Hsu et al. |
| 7,738,182 B2 | 6/2010 | Eguchi |
| 2002/0057505 A1 | 5/2002 | Sato |
| 2006/0056047 A1 | 3/2006 | Oshita |
| 2008/0151385 A1 | 6/2008 | Ohashi |
| 2008/0239517 A1 | 10/2008 | Mori |
| 2009/0086340 A1* | 4/2009 | Sato ............................ 359/794 |
| 2009/0141368 A1 | 6/2009 | Iyama |
| 2009/0201590 A1 | 8/2009 | Sugita |
| 2010/0060992 A1 | 3/2010 | Hirose |
| 2011/0310496 A1 | 12/2011 | Kubota et al. |

FOREIGN PATENT DOCUMENTS

| | | |
|---|---|---|
| JP | 4-235514 | 8/1992 |
| JP | 8-152555 | 6/1996 |
| JP | 2000-19391 | 1/2000 |
| JP | 3625923 | 12/2004 |
| JP | 2007-108703 | 4/2007 |
| JP | 2007-225959 | 9/2007 |
| JP | 2008-233585 | 10/2008 |
| JP | 2009-198960 | 9/2009 |
| JP | 2010-39088 | 2/2010 |
| JP | 2010-44225 | 2/2010 |
| WO | WO 2008062661 | 5/2008 |

OTHER PUBLICATIONS

U.S. Appl. No. 13/803,112, filed Mar. 14, 2013, Ohashi, et al.
U.S. Appl. No. 13/828,197, filed Mar. 14, 2013, Ohashi.
Partial Search Report issued Oct. 11, 2011 in European Patent Application No. 11171250.1-2217.
Extended European Search Report issued Dec. 29, 2011, in Patent Application No. 11171250.1.

* cited by examiner

FIG. 9
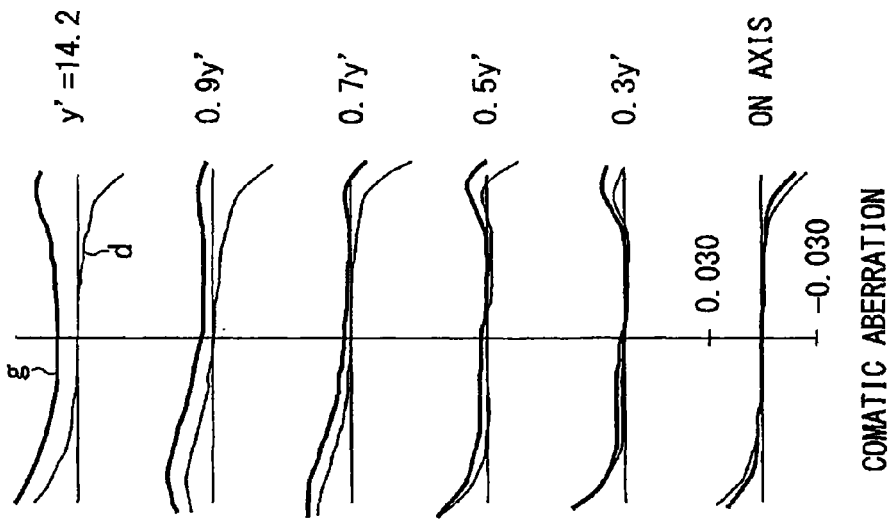
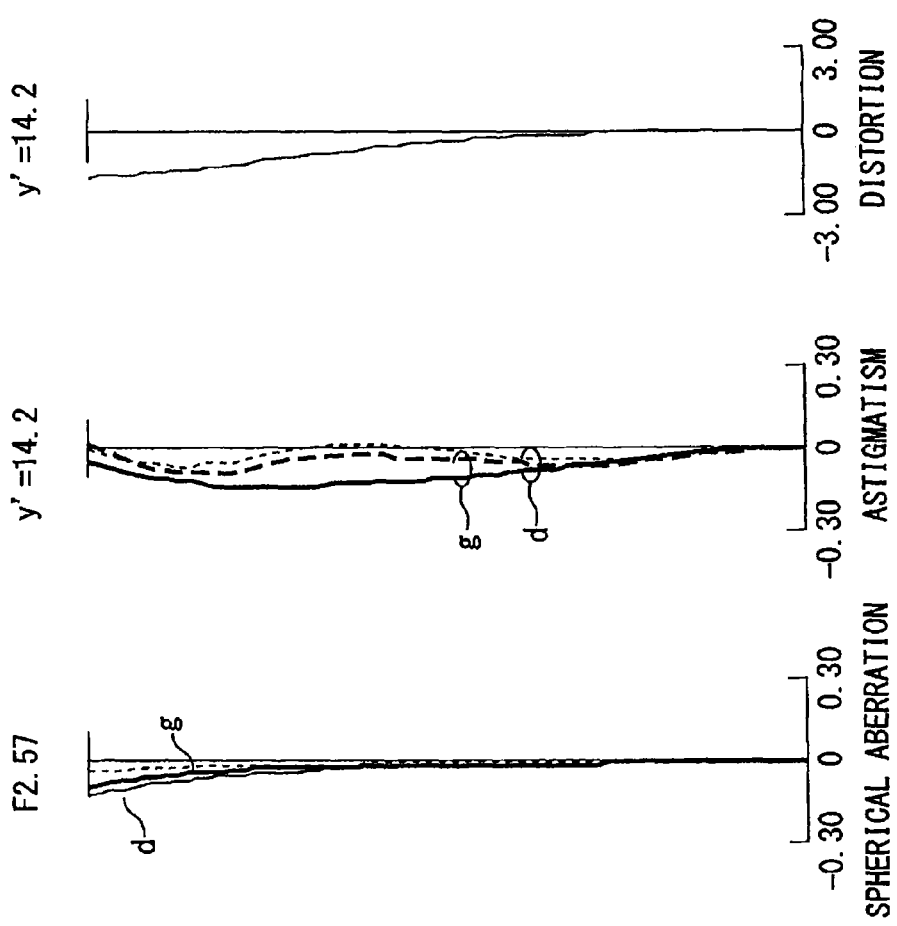

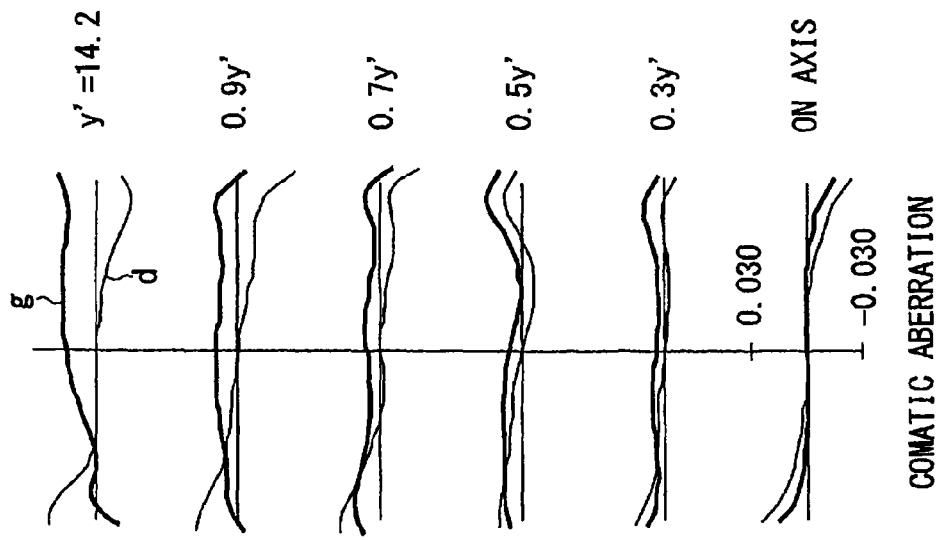
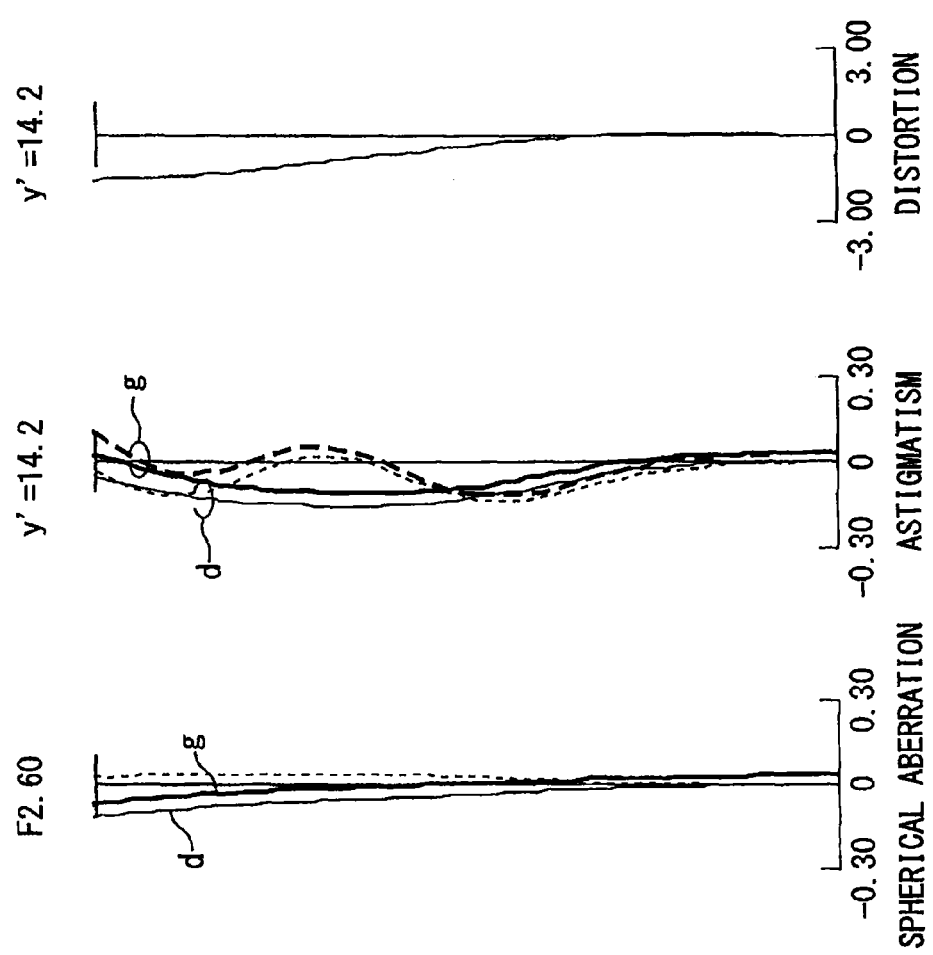
FIG. 12

IMAGE-FORMING LENS, AND IMAGING APPARATUS AND INFORMATION DEVICE USING THE IMAGE-FORMING LENS

CROSS REFERENCE TO RELATED APPLICATIONS

The present application is a divisional application of U.S. application Ser. No. 13/167,368, filed Jun. 23, 2011 and is based on and claims priority from Japanese patent application numbers 2010-144335, filed Jun. 24, 2010 and 2010-172422, file Jul. 30, 2010, the disclosures of which are hereby incorporated by reference herein in their entireties.

BACKGROUND

The present invention relates to an image-forming lens that forms an image of a photographic subject in order to image a still image or a moving image, and to an imaging apparatus, and an information device such as a portable information terminal device and the like having an imaging function using the image-forming lens. The image-forming lens is capable of being used in a silver-halide imaging apparatus using a silver-halide film, and in particular, the image-forming lens is suitable for an imaging apparatus using an electronic imaging device such as a digital camera, a digital video imaging apparatus, and the like.

As the market of so-called digital cameras has been getting larger and larger, requests regarding digital cameras from users are varied.

Among such digital cameras, a category of a small imaging apparatus with high-picture quality in which a relatively large image sensor, a diagonal length of which is about 20 mm to 45 mm, is used and a high-performance single focus lens is mounted is attracting attention from users.

A request from users in this category is heavily weighted toward not only high performance but also excellent portability, that is, miniaturization.

Here, in terms of high performance, at least, in addition to having a resolution capable of corresponding to an image sensor having about 10 to 20 million pixels (high resolution), less coma flare, high contrast and no point image distortion in a peripheral part of a field angle at an open aperture, less chromatic aberration and no occurrence of unnecessary coloring in a part having a large brightness difference, less distortion and capability of drawing a straight line as a straight line, and so on are at least needed.

Additionally, in terms of a large diameter, due to the necessity of making a difference from a general compact imaging apparatus having a zoom lens, at least a smallest f-number which is less than F2.8 where an aperture is open at a maximum is needed.

Moreover, in terms of miniaturization, in a high-resolution compact imaging apparatus, since a relatively large image sensor is used for a size of a body of the imaging apparatus, a real focal length is longer than that of a compact imaging apparatus having a small image sensor. Therefore, in order to achieve miniaturization having the high resolution image sensor, it is necessary to shorten an entire length of the image-forming lens in the imaging apparatus.

Furthermore, in terms of the field angle of a shooting lens, many users demand a rather wide angle, and it is preferable that a half-field angle of an image-forming lens be about 38 degrees.

The half-field angle of 38 degrees is equivalent to a focal length of 28 mm for a 35 mm silver-halide imaging apparatus using a traditional 35 mm silver-halide film (so-called a Leica format silver-halide film).

As an image-forming lens for a digital camera, many types are considered; however, as a typical constitution of a wide-angle single focus lens, there is a so-called retrofocus type image-forming lens having a lens group with a negative refractive power on an object side and a lens group with a positive refractive power on an image side.

An area sensor used as an image sensor has a characteristic such that each pixel is provided with a color filter or a micro lens. And there is a demand that an exit pupil position be distant from an image plane and a marginal light flux be incident onto the sensor at an angle close to perpendicularity. Those are the reasons for employing the retrofocus type image-forming lens.

However, in the retrofocus type image-forming lens, asymmetry of its refractive power arrangement is large, and corrections of comatic aberration, distortion, transverse chromatic aberration and the like tend to be incomplete.

In addition, in the retrofocus type image-forming lens, originally, the purpose is to ensure a back focus to use a wide-angle lens as a detachable lens for a single-lens reflex imaging apparatus. Therefore, as is clear from the above, the entire length of the lens (a distance from a most object side to a most image side of a lens system) tends to be longer.

Japanese patent application publication numbers 2010-39088, H09-96759, and the like disclose that such a retrofocus-type image-forming lens, in which the smallest f-number is less than 2.8, the half-field angle is around 38 degrees, and various aberrations can be favorably corrected.

The image-forming lens disclosed in Japanese patent application publication number 2010-39088 has the smallest f-number of about 1.9 and is bright. However, the entire length of the lens is more than nine times larger than a maximum image height, and is not sufficient for miniaturization.

Additionally, the image-forming lens disclosed in Japanese patent application publication number H09-96759 has a half-field angle of 41.5 degrees and is wide-angle. However, the entire length of the lens is more than six times larger than a maximum image height, and is not sufficient for miniaturization, either.

SUMMARY

An objective of the present invention is to provide an image-forming lens with high performance, and an imaging apparatus and an information device using the image-forming lens. In particular, the objective of the present invention is to provide an image-forming lens that is wide-angle and has a large diameter such that the half-field angle is about 38 degrees and the smallest f-number is less than 2.8, and is small enough, and sufficiently decreases astigmatism, field curvature, transverse chromatic aberration, a color difference of comatic aberration, distortion and so on, has a resolution corresponding to an image sensor having 10 million to 20 million pixels, has no point image distortion in a peripheral part of a field angle at an open aperture, has high contrast, and does not cause unnecessary coloring in a part where a brightness difference is large, and is capable of drawing a straight line as a straight line without distortion.

In order to achieve the above objective, an embodiment of the present invention provides: an image-forming lens comprising, from an object side to an image side in order: a first lens group; an aperture; and a second lens group with a positive refractive power, the first lens group including, from the object side in order: a first F lens group with a negative refractive power; and a first R lens group with a positive refractive power, the first F lens group including, from the object side in order: a first negative lens which has a surface on the image side having a large curvature; and a second negative lens which has a surface on the object side having a large curvature, and the first R lens group including: any one of a positive lens and a cemented lens with a positive refractive power as a whole, wherein a distance from a surface on a most object side of the first lens group to an image plane in a state of focusing on an object at infinity: L, and a maximum image height: Y' satisfy Conditional expression 1: 2.8<L/Y'<4.3.

In order to achieve the above objective, an embodiment of the present invention provides: an image-forming lens comprising, from an object side to an image side in order: a first lens group; an aperture; and a second lens group with a positive refractive power, the first lens group including, from the object side in order: a first F lens group with a negative refractive power; and a first R lens group with a positive refractive power, the first F lens group including, from the object side in order: a first negative lens which has a surface on the image side having a large curvature; and a second negative lens which has a surface on the object side having a large curvature, and the first R lens group including: any one of a positive lens and a cemented lens with a positive refractive power as a whole, wherein a distance from a surface on a most object side of the first lens group to an image plane in a state of focusing on an object at infinity: L, a maximum image height: Y', a curvature radius of the surface on the object side of the second negative lens: $r_{21}$, and a curvature radius of a surface on the image side of the second negative lens: $r_{22}$ satisfy Conditional expression 1: 2.8<L/Y<4.3 and Conditional expression 2: $-7.0<(r_{21}+r_{22})/(r_{21}-r_{22})<-0.7$.

In order to achieve the above objective, an embodiment of the present invention provides: an image-forming lens comprising, from an object side to an image side in order: a first lens group that has a positive refractive power or is approximately afocal; an aperture; and a second lens group having a positive refractive power, the first lens group including, from the object side in order: a first negative lens that has a surface on the image side having a large curvature; a second negative lens that has a surface on the object side having a large curvature; and a first R lens group having a positive refractive power of a single lens or a cemented lens, the second lens group including, from the object side in order: a second F lens group with a positive refractive power where a biconvex lens and a biconcave lens are cemented; a second M lens group with a negative refractive power of a single lens or a cemented lens having a concave shape on a surface on a most object side and a convex shape on a surface on a most image side; and a second R lens group of a positive lens.

BRIEF DESCRIPTION OF THE DRAWINGS

FIG. 9 illustrates aberration diagrams of spherical aberration, astigmatism, distortion, comatic aberration in a state where the image-forming lens illustrated in FIG. 7 is focused on the object in the near distance at $-\frac{1}{20}\times$.

FIG. 12 illustrates aberration diagrams of spherical aberration, astigmatism, distortion, comatic aberration in a state where the image-forming lens illustrated in FIG. 10 is focused on the object in the near distance at $-\frac{1}{20}\times$.

FIG. 19A illustrates a state where an imaging lens structured by using the image-forming lens according to an embodiment of the present invention is collapsed in a body of the digital camera, and FIG. 19B illustrates a state (partially omitted) where the imaging lens is extended from the body of the digital camera.

DETAILED DESCRIPTION OF THE PREFERRED EMBODIMENTS

Figure 1:
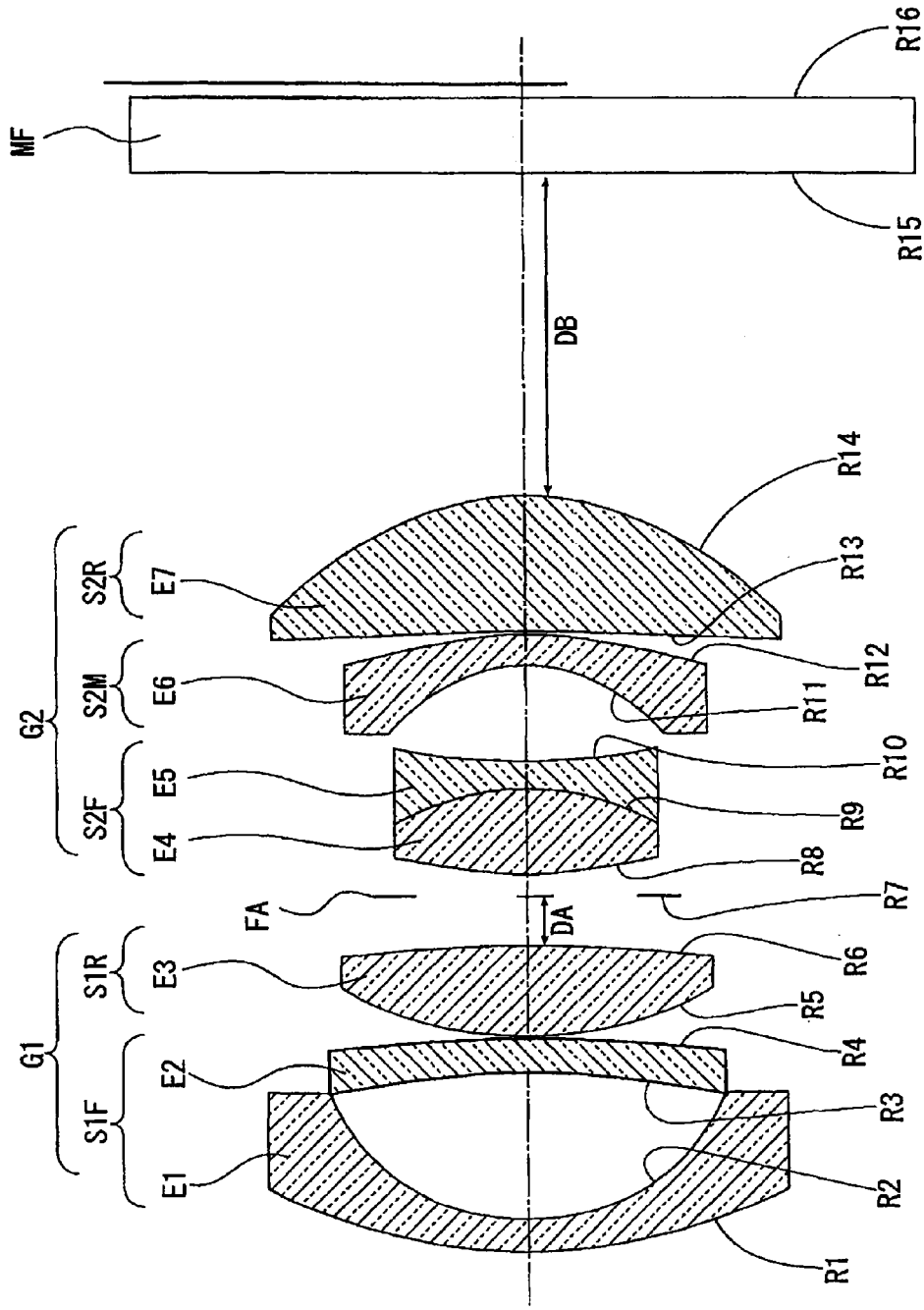
FIG. 1 is a schematic cross-sectional diagram along an optical axis illustrating a constitution of an optical system of an image-forming lens according to Example 1 of the present invention.

Hereinafter, embodiments of the present invention will be explained in detail.

In an image-forming lens according to an embodiment of the present invention, the image-forming lens of a so-called retrofocus type image-forming lens, generally, a lens system having a negative refractive power is arranged on an object side and a lens system having a positive refractive power is arranged on an image side. And due to its asymmetry, distortion, transverse chromatic aberration, and the like occur easily, and decreasing those aberrations is a major issue to solve.

When making a diameter of the lens larger, this makes it difficult to correct comatic aberration or a color difference of comatic aberration, and more problems may occur.

In addition, the lens system of the retrofocus type image-forming lens is a lens system having been developed for ensuring a back focus by moving a principle point to a rear side (that is, an image side). Therefore, there is a tendency of increasing an entire length of the lens making it difficult to correct the above aberration.

In the embodiment of the present invention, by employing the following constitutions, it is possible to solve those problems.

That is, the image-forming lens has a first lens group which is arranged on an object side from an aperture, and a second lens group having a positive refractive power which is arranged on an image side from the aperture. The first lens group has a first F lens group having a negative refractive power and a first R lens group having a positive refractive power in order from the object side. The first F lens group includes, in order from the object side, a first negative lens that has a surface on the image side having a large curvature, and a second negative lens that has a surface on the object side having a large curvature, and the first R lens group includes a positive lens, or a cemented lens having a positive refractive power entirely. And the image-forming lens satisfies following conditional expressions.

$$2.8 < L/Y' < 4.3$$ [Conditional expression 1]

$$-7.0 < (r_{21}+r_{22})/(r_{21}-r_{22}) < -0.7$$ [Conditional expression 2]

In the above conditional expressions, L denotes a distance from a surface on a most object side of the first lens group to the image side in a state of focusing on an object at infinity, Y' denotes a maximum image height, $r_{21}$ denotes a curvature radius of a surface on the object side of the second negative lens, and $r_{22}$ denotes a curvature radius of a surface on the image side of the second negative lens.

Firstly, in the image-forming lens according to the embodiment of the present invention, on the image side of the first lens group, a lens group (first R lens group) having a positive refractive power is arranged, the aperture is placed between the first lens group and the second lens group having a positive refractive power, and the first lens group and the second group face each other. Therefore, it is easy to control off-axis aberration.

Additionally, the point is a shape of the second negative lens which is a second lens arranged from the object side in the first F lens group.

The first lens group has a lens group (first F lens group) having a negative refractive power on the object side, and a lens group (first R lens group) having a positive refractive power on the image side. In conventional similar examples, there are many cases where both ensuring a field angle and correction of various aberrations such as spherical aberration and so on are performed by taking a relatively large interval between those.

However, it is not possible to achieve sufficient miniaturization.

In order to solve the above, the second negative lens has a surface on the object side having a large curvature, and in particular, on the assumption that the entire length of the lens is in a range of Conditional expression 1, it is preferable that a shape satisfy Conditional expression 2.

Note that if $(r_{21}+r_{22})/(r_{21}-r_{22})$ is less than or equal to −7.0, the refractive power of the second negative lens becomes smaller, and aberration is easily offset by a surface on the object side of the second negative lens and a surface on the image side of the second negative lens. And therefore interaction of aberration between other lenses decreases, the role of aberration correction of the second negative lens is limited, and an entire aberration level does not decrease.

On the other hand, if $(r_{21}+r_{22})/(r_{21}-r_{22})$ is equal to or more than −0.7, on-axis aberration (spherical aberration) and off-axis aberration (especially, astigmatism or comatic aberration of lower light (light passes through a lower part of a lens)) do not balance each other, and it is difficult to ensure picture qualities in the center of a picture and in a peripheral part.

Additionally, it is preferable that the image-forming lens according to the embodiment of the present invention satisfy the following conditional expression.

$$0.8 < Bf/Y' < 1.6$$ [Conditional expression 3]

In Conditional expression 3, Bf denotes a distance from a surface on a most image side of the second lens group to the image plane in the state of focusing on the object at infinity, and Y' denotes the maximum image height.

Note that if Bf/Y' is not less than or equal to 0.8, on the assumption of an imaging apparatus with a collapsible-lens type, it is difficult to be stored effectively, and an image is likely to be affected by a scratch or a dust on a lens surface of the second lens group, and therefore it is unfavorable.

On the other hand, if Bf/Y' is equal to or more than 1.6, a space to arrange lens groups is substantially small, and therefore it is difficult to perform aberration correction sufficiently.

Additionally, it is preferable that the image-forming lens according to the embodiment of the present invention satisfy the following conditional expression.

$$0.20 < L_1/L < 0.32$$ [Conditional expression 4]

In Conditional expression 4, $L_1$ denotes a distance from a surface on a most object side of the first lens group to a surface on a most image side of the first lens group, and L denotes the surface on the most object side of the first lens group to the image plane in the state of focusing on the object at infinity.

Note that if $L_1/L$ is less than or equal to 0.20, there is a possibility that a lens group including three groups of three lenses or three groups of four lenses which is arranged as the first lens group does not form a suitable shape to perform aberration correction with a sufficient degree of freedom.

On the other hand, if $L_1/L$ is equal to or more than 0.32, the aperture is too close to the image plane, it is difficult to distance an exit pupil position from the image plane, and a refractive power arrangement in the second lens group does not balance to recover the above, and therefore it is unfavorable.

Moreover, as a refractive power arrangement of an entire image-forming lens, it is preferable to satisfy the following conditional expression.

$$0.0 < f_A/f_1 < 0.6 \quad \text{[Conditional expression 5]}$$

In Conditional expression 5, $f_A$ denotes a focal length of the entire image-forming lens, and $f_1$ denotes the focal length of the first lens group.

In the image-forming lens according to the embodiment of the present invention, it is also considered that the first lens group functions as a so-called wide-converter added to the second lens group.

However, in terms of actual aberration correction, it is not always ideal that the first lens group be perfectly afocal.

Note that if $f_A/f_1$ is less than or equal to 0.0, a refractive power of the second lens group has to be increased, curvature on the image plane increases, large negative distortion easily occurs, and therefore it is unfavorable.

On the other hand, if $f_A/f_1$ is equal to or more than 0.6, the contribution to an image-forming function of the second lens group decreases, the first lens group comes to share this, and therefore an interaction of a relatively large aberration between the first lens group and the second lens group occurs, unnecessary production error sensitivity increases, and therefore it is unfavorable.

As a refractive power arrangement of the first lens group, it is preferable to satisfy the following conditional expression.

$$1.3 < f_{1F}/f_{1R} < -0.7 \quad \text{[Conditional expression 6]}$$

In Conditional expression 6, $f_{1F}$ denotes a focal length of the first F lens group (a combined focal length of the first negative lens and the second negative lens), $f_{1R}$ denotes a focal length of the first R lens group.

Here, if $f_{1F}/f_{1R}$ is less than or equal to $-1.3$, the first lens groups comes to have a relatively strong refractive power, and it may be difficult to satisfy Conditional expression 5.

On the other hand, if $f_{1F}/f_{1R}$ is $-0.7$, in order to satisfy Conditional expression 5, the first lens group becomes larger, and if miniaturization is forced, it is difficult to perform aberration corrections, and therefore it is unfavorable.

Note that regarding Conditional expressions 5 and 6, it is possible to perform better aberration corrections if each of the following conditional expressions is satisfied.

$$0.0 < f_A/f_1 < 0.3 \quad \text{[Conditional expression 5']}$$

$$-1.0 < f_{1F}/f_{1R} < -0.7 \quad \text{[Conditional expression 6']}$$

In addition, it is preferable that the first lens group satisfy the following conditional expression.

$$0.0 < A_{1F-1R}/L_1 < 0.1 \quad \text{[Conditional expression 7]}$$

In Conditional expression 7, $A_{1F-1R}$ denotes an interval between the first F lens group and the first R lens group, and $L_1$ denotes the distance from the surface on the most object side of the first lens group to the surface on the most image side of the first lens group.

In the constitution of the image lens according to the embodiment of the present invention, it is preferable that a numerical value of $A_{1F-1R}/L_1$ be smaller, and if it is equal to or more than 0.1, it is difficult to balance aberrations.

It is preferable that at least one of a material of the first negative lens of the first F lens group and a material of the second negative lens of the first F lens group satisfy the following Conditional expressions.

$$1.45 < n_d < 1.65 \quad \text{[Conditional expression 8]}$$

$$55.0 < \nu_d < 95.0 \quad \text{[Conditional expression 9]}$$

$$0.015 < P_{g,F} - (-0.001802 \times \nu_d + 0.6483) < 0.050 \quad \text{[Conditional expression 10]}$$

In Conditional expressions 8 to 10, $n_d$ denotes a refractive index of the first negative lens or the second negative lens of the first F lens group, $\nu_d$ denotes Abbe's number of the first negative lens or the second negative lens, and $P_{g,F}$ denotes a partial dispersion ratio of the first negative lens or the second negative lens.

Here, the partial dispersion ratio $P_{g,F}$ is expressed by $$P_{g,F} = (n_g - n_F)/(n_F - n_C).$$

In this expression, each of $n_g$, $n_F$, and $n_C$ denotes a refractive index with respect to a g-line, an F-line, and a C-line of an optical glass constituting the negative lenses, respectively.

At least one of the first negative lens and the second negative lens of the first F lens group includes a so-called anomalous dispersion glass which satisfies Conditional expressions 8 to 10, so that a secondary spectrum of chromatic aberration is effectively decreased, and it is possible to achieve a more favorable corrected state.

In addition, the first R lens group is a cemented lens, and it is preferable to be a cemented lens of a positive lens and a negative lens, in order from the object side.

Thus, the first R lens group is the cemented lens of the positive lens and the negative lens, in order from the object side, so that it is possible to correct axial chromatic aberration favorably.

In the image-forming lens according to the embodiment of the present invention, in a case of focusing on an object in a near distance, it is preferable to make an interval between the first lens group and the second lens group shorter than that in the state of focusing on the object at infinity.

In a case where focusing on the object in the near distance is performed by a simple entire extension of the image-forming lens, positive field curvature (field curvature in a direction distant from the lens in a peripheral part) is likely to occur. However, the interval between the first lens group and the second lens group is shortened appropriately in accordance with the extension, so that it is possible to suppress an occurrence of field curvature.

It is more preferable to satisfy the following conditional expression.

$$-0.5 < (A_{1-2M} - A_{1-2})/(Bf_M - Bf) < -0.2 \quad \text{[Conditional expression 11]}$$

In Conditional expression 11, $A_{1-2}$ denotes an interval between the first lens group and the second lens group in the state of focusing on the object at infinity, $A_{1-2M}$ denotes an interval between the first lens group and the second lens group in a case of focusing on the object in the near distance at an imaging magnification of $-\frac{1}{20}\times$, $Bf_m$ denotes a distance from a surface on the most image side of the second lens group to the image plane in the case of focusing on the object in the near distance at an imaging magnification of $-\frac{1}{20}\times$, and $Bf$ denotes a distance from the surface on the most image side of the second lens group to the image plane in the state of focusing on the object at infinity.

Note that if $(A_{1-2M} - A_{1-2})/(Bf_M - Bf)$ is less than or equal to $-0.5$, a change of interval between the first lens group and the second lens group becomes excessive, and accordingly negative field curvature is likely to occur in the near distance rather than in infinity.

On the other hand, if $(A_{1-2M}-A_{1-2})/(Bf_M-Bf)$ is equal to or more than −0.2, the change of the interval between the first lens group and the second lens group is not sufficient, and accordingly positive field curvature is likely to occur in the near distance rather than in infinity.

Additionally, regarding the second lens group, it is preferable to satisfy the following conditional expressions.

$-3.0 < f_{2b}/f_2 < -0.4$  [Conditional expression 12]

$-6.0 < (r_{2bF}+r_{2bR})/(r_{2bF}-r_{2bR}) < -2.0$  [Conditional expression 13]

$1.80 < n_{d2b} < 2.20$  [Conditional expression 14]

In Conditional expression 12, $f_{2b}$ denotes a focal length of the second M lens group S2M, and $f_2$ denotes a focal length of the second lens group G2, and in Conditional expression 13, $r_{2bF}$ denotes a curvature radius of the surface on the most object side of the second M lens group S2M, and $r_{2bR}$ denotes a curvature radius of the surface on the most image side of the second M lens group S2M, and in Conditional expression 14, $n_{d2b}$ denotes an average value of a refractive index of a lens constituting the second M lens group S2M.

Conditional expression 1 is a conditional expression that controls the entire length of the lens L, which is prerequisite for Conditional expressions 12, and 13, in a relationship between the maximum image height Y' (that is controlled by a length of a diagonal line of the light-receiving surface of the image sensor.).

Conditional expression 12 is a conditional expression regarding a refractive power of the second M lens group. If $f_{2b}/f_2$ is less than or equal to a lower limit −3.0, the refractive power of the second M lens group is not sufficient, spherical aberration is not corrected sufficiently, and an astigmatic difference is not sufficiently suppressed, and therefore it is unfavorable.

If $f_{2b}/f_2$ is equal to or more than an upper limit −0.4, the refractive power of the second M lens group is too strong, and an interaction of aberration among each surface constituting the second lens group becomes excessive, and it is difficult to suppress all aberrations sufficiently, and sensitivity for a production error becomes high, and therefore it is unfavorable.

Conditional expression 13 is a conditional expression regarding a shape of the second M lens group. If $(r_{2bF}+r_{2bR})/(r_{2bF}-r_{2bR})$ is less than or equal to a lower limit −6.0, a meniscus shape of the second M lens group is too strong, and spherical aberration tends to be corrected excessively, and inward comatic aberration tends to occur.

If $(r_{2bF}+r_{2bR})/(r_{2bF}-r_{2bR})$ is equal to or more than an upper limit −2.0, it is difficult to maintain the meniscus shape which is necessary for the second M lens group, and spherical aberration tends to be corrected insufficiently, and outward comatic aberration tends to occur. And therefore, in the second lens group as a whole, a positive refractive power on the image side is not sufficient, and there may be a case where an exit pupil distance is not sufficiently apart from the image plane.

Therefore, the image-forming lens that satisfies Conditional expressions 1, 12, and 13 can correct aberration appropriately, and it is possible to achieve an image-forming lens with high performance that is capable of becoming smaller.

Conditional expression 14 is a conditional expression that is preferably satisfied by the second M lens group S2M with the above Conditional expressions 1, 12, and 13. If $n_{d2b}$ is less than or equal to a lower limit 1.80, it is difficult to suppress field curvature sufficiently. If $n_{d2b}$ is less than or equal to the lower limit 1.80, and field curvature is suppressed forcedly, curvature of each surface has to be set large, and an occurrence of other aberrations increases, and it is difficult to balance the aberrations as a whole.

If $n_{d2b}$ is equal to or more than an upper limit 2.20, there may be no such an optical material that the upper limit is equal to or more than 2.20, or if it exists, it may be very expensive, and therefore using such an optical material can not be realistic.

In the image-forming lens that satisfies Conditional expression 14 with Conditional expressions 1, 12 and 13, field curvature is decreased sufficiently, and it is possible to achieve an image-forming lens that is smaller and has high performance.

In addition, it is preferable that the second lens group includes a second F lens group having a positive refractive power, a second M lens group having a negative refractive power, and a second R lens group having a positive refractive power, in order from the object side.

The second F lens group can be a cemented lens having a meniscus shape a convex surface of which faces the object side as a whole.

The second M lens group can be a negative meniscus lens a concave surface of which faces the object side, or a cemented lens having a negative meniscus shape a concave surface of which faces the object side as a whole.

The second R lens group can be a positive lens a convex surface of which faces the image side. In order to more favorably correct distortion, and the like, it is possible to have an aspheric surface in the second R lens group.

Additionally, in order to suppress various aberrations which tend to increase in accordance with miniaturization, it is preferable to have an aspheric surface also in the first F lens group.

It is preferable to have aspheric surfaces in the first F lens group and the second R lens group together to mutually complement functions of aberration correction and work more effectively.

Furthermore, an imaging apparatus according to the embodiment of the present invention is an imaging apparatus such as a digital camera, or the like, and includes the image-forming lens as described above used for an imaging optical system.

And an information device according to the embodiment of the present invention is an information device such as a portable information terminal device, or the like, and has an imaging function, and includes the image-forming lens as described above used for an imaging optical system.

And, in the image-forming lens according to the embodiment of the present invention, the refractive power of the first R lens group on the most image side of the first lens group G1 is positive, and the refractive power of the second F lens group on the most object side of the second lens group G2 is positive.

Thus, the first R lens group having the positive refractive power and the second F lens group having the positive refractive power face each other via the aperture, and on their outside, the second negative lens having the negative refractive power and the second M lens group having the negative refractive power are placed, respectively. While the image-forming lens is a retrofocus type image-forming lens as a whole, it is easy to correct comatic aberration and transverse chromatic aberration by considering symmetry of the arrangement of the refractive power.

Moreover, since the cemented lens of the biconvex lens on the object side and the biconcave lens on the image side constitutes the second F lens group, a negative refractive power in the middle of the second lens group G2 is shared by the biconcave lens and the second M lens group, and therefore both monochromatic aberration and chromatic aberration are favorably decreased.

And forming the second F lens group as the cemented lens makes it possible to decrease an influence of a production error such as an optical axis shift occurring in assembly to a lens frame.

Furthermore, a shape of the negative lens constituting the second negative lens is important.

The first lens group G1 has a lens system having the negative refractive power on the object side (the first negative lens and the second lens) and a lens system having the positive refractive power on the image side (the first R lens group). In the known retrofocus type image-forming lens, there are many cases where both ensuring a field angle and correction of various aberrations such as spherical aberration and the like are obtained by relatively enlarging this interval (interval between the lens system having the negative refractive power and the lens system having the positive refractive power).

However, the image-forming lens in which the interval between the lens system having the negative refractive power and the lens system having the positive refractive power on the object side from the aperture is large does not make it possible to achieve sufficient miniaturization of a diameter of the image-forming lens.

In the image-forming lens according to the embodiment of the present invention, the negative lens constituting the second negative lens has the surface on the object side having the large curvature, and therefore it is possible to correct on-axis aberration (spherical aberration) and off-axis aberration (especially, astigmatism or comatic aberration of lower light (light passes through a lower part of a lens)) favorably.

The second M lens group is the single lens or the cemented lens as described above, however in either case, the surface on the most object side is the concave surface, and the surface on the most image side is the convex surface.

That is, in a case where the second M lens group is the single lens, a negative meniscus lens having a concave surface on the object side constitutes the second M lens group, and also in a case where the second M lens group is the cemented lens, the cemented lens having a negative meniscus shape and a concave surface on the object side as a whole constitutes the second M lens group.

By forming the second M lens group as described above, an air lens (air space) having a strong negative refractive power is formed between the surface on the most object side of the second M lens group and the surface on the most image side of the second F lens group, which greatly functions a role in correction of spherical aberration and field curvature of the second lens group G2 having the arrangement of the positive, negative, and positive refractive power as a whole.

In addition, by forming the surface on the most image side of the second M lens group as a concentric shape, an occurrence of comatic aberration is suppressed, and at the same time, a positive refractive power is shared together with the second R lens group, and an exit pupil position is apart from the image plane.

Thus, in the image-forming lens of the embodiment of the present invention, a structure of each part is optimized for purposes, and therefore a new effect is obtained comprehensively, and it is possible to achieve an image-forming lens that is wide-angle, and small, and has a large diameter and high performance.

In such a basic structure, by satisfying each of the above Conditional expressions, it is possible to achieve an image-forming lens that is smaller and has higher performance.

Example 1

Next, specific examples will be explained based on the embodiment of the present invention as described above.

The following Examples 1 to 6 are examples of specific configurations by specific numerical value examples of image-forming lenses according to the present invention. And Example 7 is a specific example of an imaging apparatus or information device according to the embodiment of the present invention using a lens unit having a zoom lens described in the Examples 1 to 6 as an imaging optical system.

The Examples 1 to 6 describe configurations and specific numerical value examples of each image-forming lens.

In each of the Examples 1 to 6, a maximum image height is 14.2 mm.

In the Examples 1 to 6, as an optical element of a parallel plate placed on an image plane side of the second lens group, an optical filter such as an optical low-pass filter, an infrared cut filter, or the like, or a cover glass (seal glass) of a light-receiving element of a CMOS (complementary metal oxide semiconductor) image sensor, or the like is considered, and here, this is referred to as a filter MF.

The optical element of the parallel plate is placed such that its surface on the image side is at a position of about 0.5 mm on the object side from the image plane; however, it is not limited thereto, and the optical element of the parallel plate can be divided into a plurality of elements.

In the Examples 1 to 6, several lens surfaces are formed into aspheric surfaces.

To form an aspheric surface, as a so-called molded aspheric lens, there is a constitution such that each surface of the lens is formed directly into an aspheric surface, and as a so-called hybrid aspheric lens, there is a constitution such that an aspheric surface is obtained by applying a resin layer to form an aspheric surface on a surface of a spherical lens, and any of the above can be used.

Aberrations in the Examples 1 to 6 are corrected at a high level, and spherical aberration and axial chromatic aberration are so small that they are negligible.

Astigmatism, field curvature, and transverse chromatic aberration are sufficiently small, and comatic aberration and its color difference distortion are favorably suppressed even in a most peripheral part, and distortion also becomes sufficiently small an absolute value of which is less than or equal to 2.0%.

By configuring an image-forming lens as in Examples 1 to 6 of the present invention, it is clear that the image-forming lens is wide-angle and has a large diameter such that a half-field angle is about 38 degrees, and a smallest f-number is less than 2.8, and extremely good optical performance can be maintained.

The following reference signs are common in the Examples 1 to 6.
F: focal length of entire system
F: F-number
ω: half-field angle (degree)
R: curvature radius (paraxial curvature radius in a case of an aspheric surface)
D: surface interval
$N_d$: refractive index
$v_d$: Abbe's number
K: conic constant of aspheric surface
$A_4$: coefficient of aspheric surface of the fourth order
$A_6$: coefficient of aspheric surface of the sixth order
$A_8$: coefficient of aspheric surface of the eighth order
$A_{10}$: coefficient of aspheric surface of the tenth order $A_{12}$: coefficient of aspheric surface of the 12th order
$A_{14}$: coefficient of aspheric surface of the 14th order
$A_{16}$: coefficient of aspheric surface of the 16th order
$A_{18}$: coefficient of aspheric surface of the 18th order An aspheric surface used here is defined by the following expression (Expression 12), when C is taken as a reciprocal of a paraxial curvature radius (curvature radius), and H is taken as a height from an optical axis.

$$X = \frac{CH^2}{1+\sqrt{1-(1+K)C^2H^2}} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$
[Expression 12]

FIG. 1 is a schematic vertical cross-sectional diagram illustrating a constitution of an optical system of an image-forming lens according to Example 1 of the present invention.

The image-forming lens illustrated in FIG. 1 has a first lens E1, a second lens E2, a third lens E3, a fourth lens E4, a fifth lens E5, a sixth lens E6, a seventh lens E7, an aperture FA, and a filter MF.

The first lens E1, the second lens E2, and the third lens E3 constitute a first lens group G1, which is placed on an object side from the aperture FA. The fourth lens E4, the fifth lens E5, the sixth lens E6, and the seventh lens E7 constitute a second lens group G2, which is placed on an image plane (image) side from the aperture FA. Each of the lens groups is supported by a common supporting frame and so on per group, and in a case of focusing and the like, each lens group moves integrally.

In this case, the aperture FA moves integrally with the second lens group G2.

In FIG. 1, a surface number of each optical surface is also illustrated.

Each reference sign in FIG. 1 is used independently per example; therefore if the same reference signs are used in each of FIGS. 4, 7, 10, and 13, each example does not always have a common constitution.

In FIG. 1, optical elements of an optical system of the image-forming lens, the first lens E1, the second lens E2, the third lens E3, the aperture FA, the fourth lens E4, the fifth lens E5, the sixth lens E6, the seventh lens E7, and the filter MF are placed in order from the object side of a photographic subject or the like, and an image of an object is formed behind the filter MF.

The first lens E1 is a negative meniscus lens that has a surface on the image side having a larger curvature (that is, a surface having a small curvature radius) than that on the object side, and a convex surface on the object side.

The second lens E2 is a negative meniscus lens that has a surface on the object side having a larger curvature than that on the image side and an aspheric shape, and has a convex surface on the object side.

The first lens E1 and the second lens E2 constitute a first F lens group S1F having a negative refractive power as a whole, and the first lens E1 corresponds to a first negative lens, and the second lens E2 corresponds to a second negative lens.

The third lens E3 is a positive lens of a biconvex lens that has a surface on the object side having a larger curvature than that on the image side. And in this case, the third lens E3 constitutes alone a first R lens group S1R having a positive refractive power.

That is, the first lens group G1 includes the first F lens group S1F having the negative refractive power of the first lens E1 and the second lens E2, and the first R lens group S1R having the positive refractive power of the third lens E3.

The fourth lens E4 is a positive lens of a biconvex lens, and the fifth lens E5 is a negative lens of a biconcave lens, and the fourth lens E4 and the fifth lens E5 are cemented together integrally to form a cemented lens of two lenses.

The cemented lens of the fourth lens E4 and the fifth lens E5 constitutes a second F lens group S2F that has a surface on the image side having a larger curvature than that on the object side, and a convex meniscus shape on the object side as a whole.

The sixth lens E6 is a negative meniscus lens that has a surface on the object side having a larger curvature than that on the image side, and an aspheric and convex surface on the image side.

The sixth lens E6 constitutes a second M lens group S2M alone.

The seventh lens E7 is a positive meniscus lens that has a surface on the image side having a larger curvature than that on the object side and an aspheric and convex shape.

The seventh lens E7 constitutes a second R lens group S2R alone.

That is, the second lens group G2 includes the second F lens group S2F of the cemented lens of the fourth lens E4 and the fifth lens E5, the second M lens group S2M having the negative refractive power of the sixth lens E6, and the second R lens group S2R having the positive refractive power of the seventh lens E7.

In the image-forming lens according to the embodiment of the present invention, regarding focusing, a simple entire extension of the image-forming lens is not performed, and in a case of focusing on an object in the near distance, an interval between the first lens group G1 and the second lens group G2 is shortened compared with that in a state of focusing on an object at infinity.

In Example 1, since the aperture FA moves integrally with the second lens group G2, the interval between the first lens group G1 and the second lens group G2 is a sum of a changeable interval DA between the first lens group G1 and the aperture FA and a fixed distance from the aperture FA and a surface on the object side of the fourth lens E4 of the second lens group G2.

That is, in accordance with an entire extension of the image-forming lens by focusing on the object in the near distance from infinity (increase of a changeable interval DB between the second lens group G2 and the filter MF), the changeable interval DA between the first lens group G1 and the aperture FA is moved to be smaller than that in a state of focusing on the object at infinity, in the case of focusing on the object in the near distance.

In Example 1, each of a focal length of an entire system f, a smallest f-number F, and a half-field angle ω is as follows.

$f$=18.28

$F$=2.51

ω=38.3 an optical characteristic of each optical element is expressed in the following table.

TABLE 1

Optical characteristic

| SURFACE NUMBER | R | D | $N_d$ | $\nu_d$ | $P_{g,F}$ | GLASS NAME | REMARKS | | |
|---|---|---|---|---|---|---|---|---|---|
| 1 | 20.770 | 1.20 | 1.49700 | 81.54 | 0.5375 | OHARA S-FPL51 | E1 | S1F | G1 |
| 2 | 8.251 | 5.94 | | | | | | | |
| 3* | −20.537 | 1.20 | 1.48749 | 70.24 | 0.5300 | OHARA S-FSL5 | E2 | | |
| 4 | −96.870 | 0.13 | | | | | | | |
| 5 | 13.535 | 3.62 | 1.77250 | 49.60 | 0.5520 | OHARA S-LAH66 | E3 | S1R | |
| 6 | −62.660 | CHANGEABLE INTERVAL DA | | | | | | | |
| 7 | APERTURE | 1.00 | | | | | FA | | |
| 8 | 21.118 | 3.29 | 1.78800 | 47.37 | 0.5559 | OHARA S-LAH64 | E4 | S2F | G2 |
| 9 | −9.881 | 1.00 | 1.69895 | 30.13 | 0.6030 | OHARA S-TIM35 | E5 | | |
| 10 | 18.982 | 3.85 | | | | | | | |
| 11 | −6.605 | 1.22 | 1.84666 | 23.77 | 0.6198 | OHARA L-TIH53 | E6 | S2M | |
| 12* | −14.621 | 0.10 | | | | | | | |
| 13 | −263.010 | 5.44 | 1.85400 | 40.39 | 0.5677 | OHARA L-LAH85 | E7 | S2R | |
| 14* | −11.149 | CHANGEABLE INTERVAL DB | | | | | | | |
| 15 | ∞ | 3.20 | 1.51680 | 64.20 | | FILTER | MF | | |
| 16 | ∞ | | | | | | | | |

In an optical characteristic table as in Table 1, an aspheric surface is expressed by a surface number with * (asterisk), and a name of a manufacturer of a glass material is expressed before a glass name, such as OHARA (OHARA INC.) and HOYA (HOYA CORPORATION) (in Example 1, a glass material of HOYA CORPORATION is not used.).

Those are the same as those in Examples 2 to 6.

That is, in Table 1, aspheric surfaces are a third surface, a 12th surface, and a 14th surface, and each aspheric surface parameter in [Expression 12] is as follows.

Aspheric Surface Parameter
Aspheric Surface of the Third Surface $K = 0.0$ $A_4 = -9.88622 \times 10^{-6}$ $A_6 = -1.42073 \times 10^{-7}$ $A_8 = -3.19806 \times 10^{-9}$ $A_{10} = 1.97408 \times 10^{-11}$ Aspheric Surface of the 12th Surface $K = -0.16558$ $A_4 = 1.59985 \times 10^{-4}$ $A_6 = 1.84355 \times 10^{-6}$ $A_8 = -2.65881 \times 10^{-8}$ $A_{10} = 1.97333 \times 10^{-10}$ Aspheric Surface of the 14th Surface $K = -0.21279$ $A_4 = 1.80877 \times 10^{-5}$ $A_6 = 1.25436 \times 10^{-7}$ $A_8 = 5.41982 \times 10^{-10}$ $A_{10} = 1.54602 \times 10^{-11}$ The changeable interval DA between the first lens group G1 and the aperture FA, and the changeable interval DB between the second lens group G2 and the filter MF are changed as described in the following table, and in the case of focusing, in a state of focusing on the object at infinity, and in a state of focusing on the object in the near distance at an imaging magnification of $-\frac{1}{20}\times$.

TABLE 2

| | Changeable interval | |
|---|---|---|
| | INFINITY | $-\frac{1}{20}\times$ |
| DA | 2.000 | 1.780 |
| DB | 12.838 | 13.811 |

Values corresponding to the above-described Conditional expressions 1 to 14 in Example 1 are as follows.

Values of Conditional Expressions $L/Y' = 3.28$ [1]

$(r_{21} + r_{22})/(r_{21} - r_{22}) = -1.538$ [2]

$Bf/Y' = 1.165$ [3]

$L_1/L = 0.260$ [4]

$f_A/f_1 = 0.532$ [5]

$f_{1F}/f_{1R} = -1.189$ [6]

$A_{1F-1R}/L_1 = -0.0108$ [7]

$n_d = 1.497$ [8]

$\nu_d = 81.5$ [9]

$P_{g,F} - (-0.001802 \times \nu_d + 0.6483) = 0.0361$ [10]

$(A_{1-2M} - A_{1-2})/(Bf_M - Bf) = 0.226$ [11]

$f_{2b}/f_2 = -0.526$ [12]

$(r_{2bF} + r_{2bR})/(r_{2bF} - r_{2bR}) = -2.65$ [13]

$(n_{d2b}) = 1.847$ [14]

Therefore, each value of the above-described Conditional expressions 1 to 14 in Example 1 is within a range of each conditional expression, and is satisfied with each of Conditional expressions 1 to 14.

Figure 2:
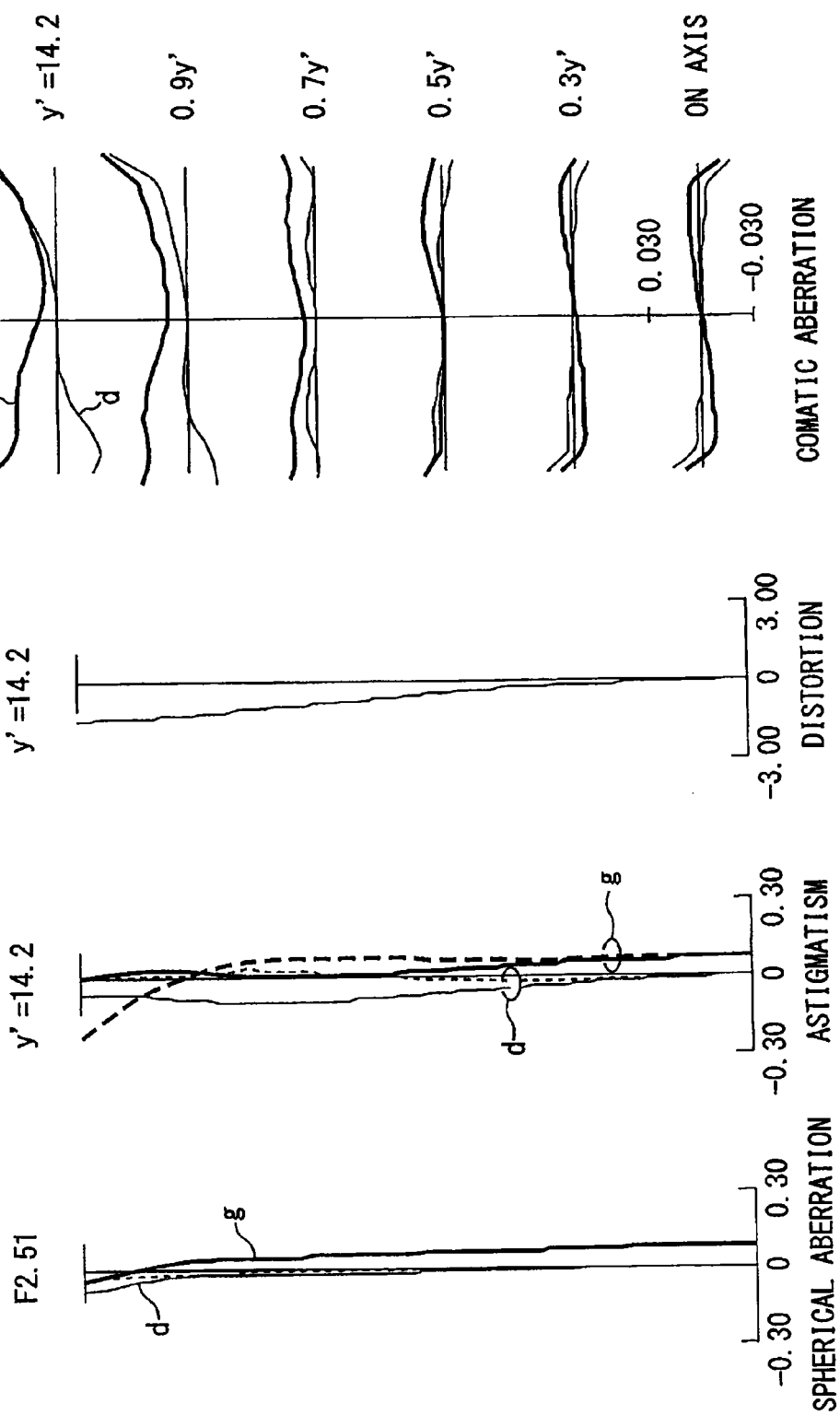
FIG. 2 illustrates aberration diagrams of spherical aberration, astigmatism, distortion, and comatic aberration in a state where the image-forming lens illustrated in FIG. 1 is focused on an object at infinity.
Figure 3:
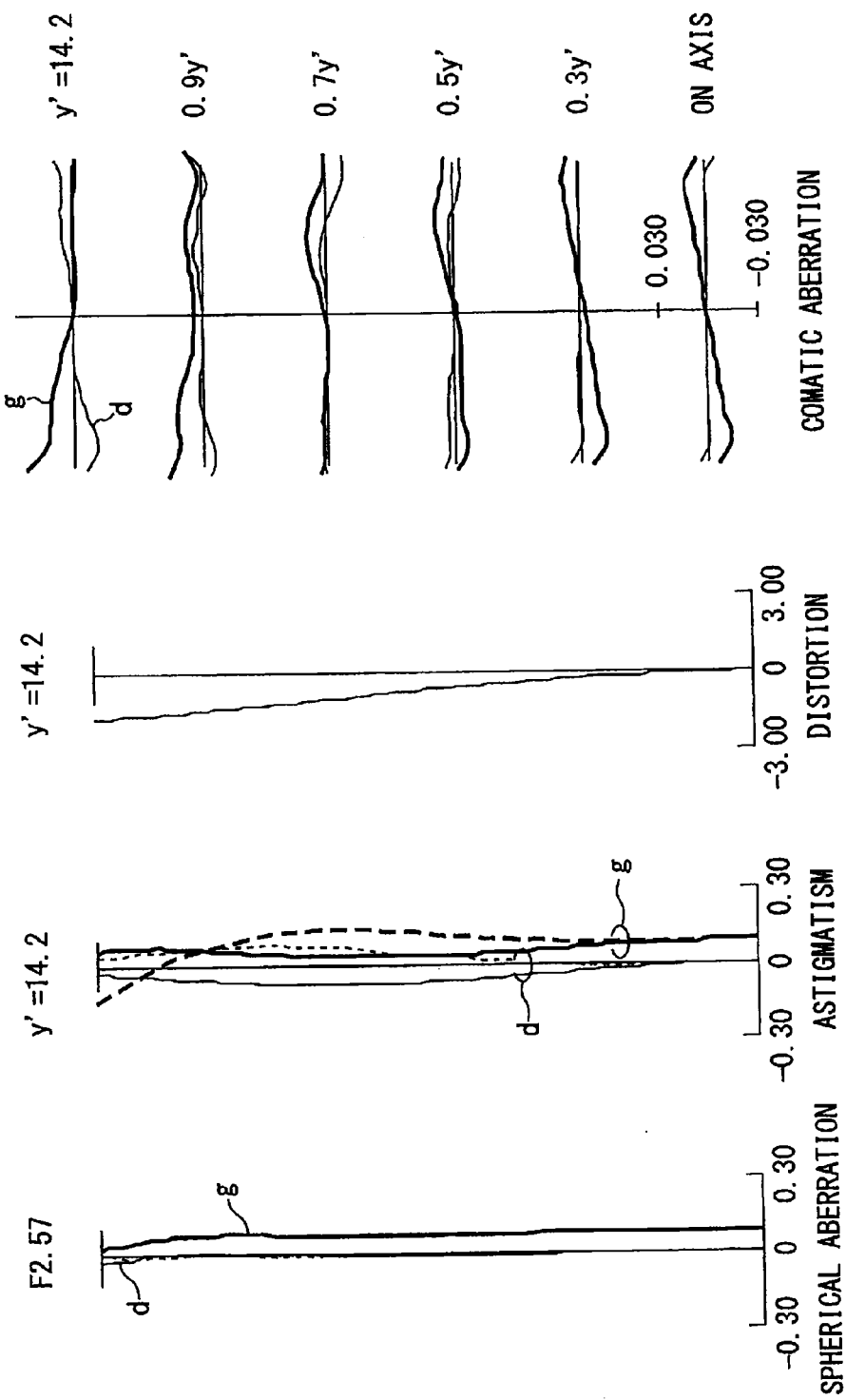
FIG. 3 illustrates aberration diagrams of spherical aberration, astigmatism, distortion, comatic aberration in a state where the image-forming lens illustrated in FIG. 1 is focused on an object in the near distance at $-\frac{1}{20}\times$.

FIG. 2 illustrates each aberration diagram of spherical aberration, astigmatism, distortion, and comatic aberration in a state where the image-forming lens according to Example 1 is focused on the object at infinity. And FIG. 3 illustrates each aberration diagram of spherical aberration, astigmatism, distortion, comatic aberration in a state where the image-forming lens according to Example 1 is focused on an object in the near distance at $-\frac{1}{20}\times$.

In those aberration diagrams, a dashed-line in a spherical aberration diagram expresses a sine condition, a solid line in an astigmatism diagram expresses astigmatism in a sagittal plane, and a dashed-line in the astigmatism diagram expresses astigmatism in a meridional plane.

"g" and "d" in each aberration diagram of spherical aberration, astigmatism, and comatic aberration express a g-line, and a d-line, respectively.

Those are the same as in aberration diagrams in other examples.

Example 2

Figure 4:
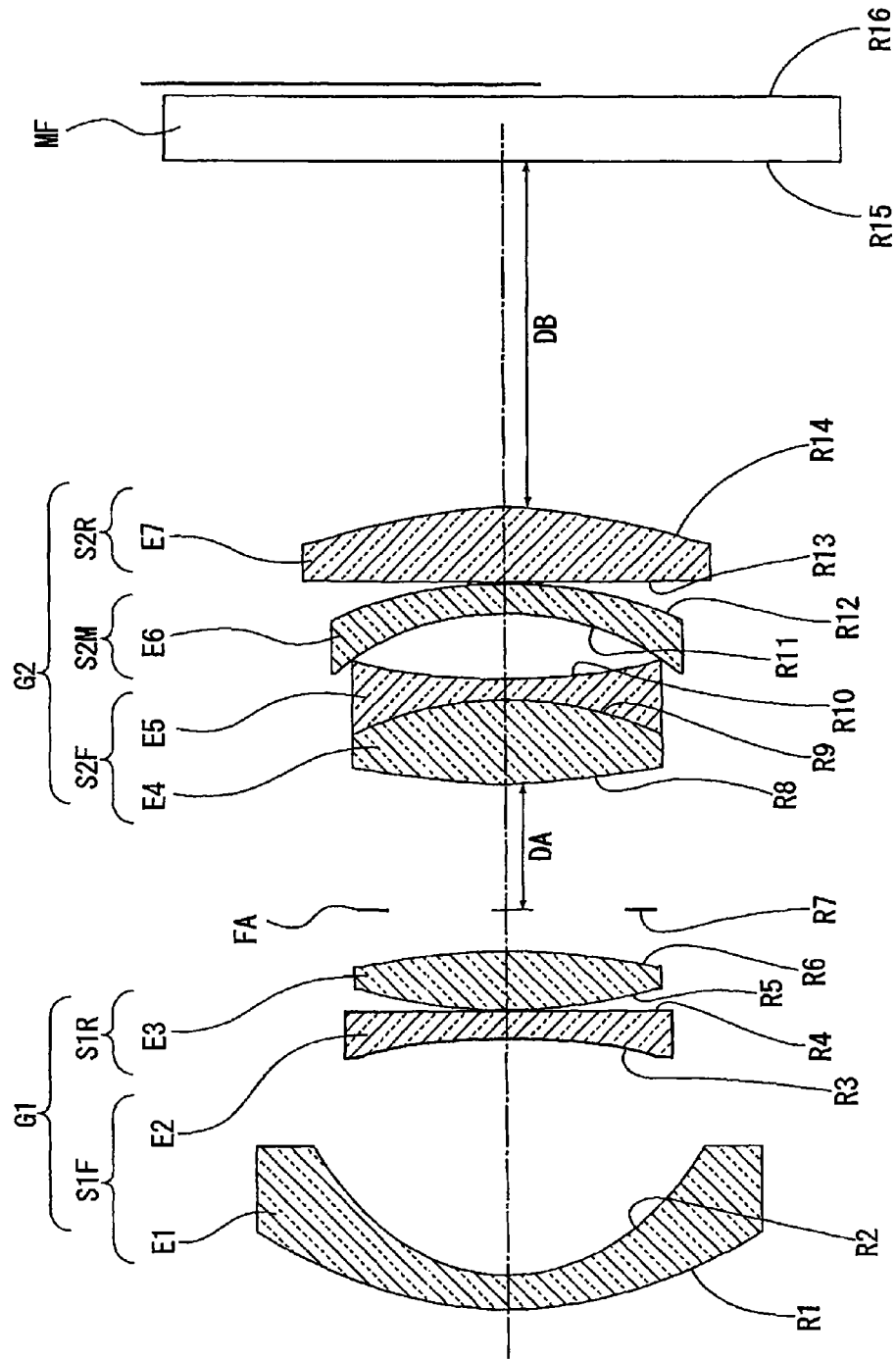
FIG. 4 is a schematic cross-sectional diagram along the optical axis illustrating a constitution of an optical system of an image-forming lens according to Example 2 of the present invention.

FIG. 4 is a schematic vertical cross-sectional diagram illustrating a constitution of an optical system of an image-forming lens according to Example 2 of the present invention.

The image-forming lens illustrated in FIG. 4 has a first lens E1, a second lens E2, a third lens E3, a fourth lens E4, a fifth lens E5, a sixth lens E6, a seventh lens E7, an aperture FA, and a filter MF.

In this case, the first lens E1, the second lens E2, and the third lens E3 constitute a first lens group G1, which is placed on an object side from the aperture FA. The fourth lens E4, the fifth lens E5, the sixth lens E6, and the seventh lens E7 constitute a second lens group G2, which is placed on an image plane (image) side from the aperture FA. Each of the lens groups is supported by a common supporting frame and so on per group, and in a case of focusing and the like, each lens group moves integrally.

In this case, the aperture FA moves integrally with the first lens group G1.

In FIG. 4, a surface number of each optical surface is also illustrated.

As described above, each reference sign in FIG. 4 is used independently per example; therefore if the same reference signs are used in each of FIGS. 1, 7, 10, and 13, each example does not always have a common constitution.

In FIG. 4, optical elements of an optical system of the image-forming lens, the first lens E1, the second lens E2, the third lens E3, the aperture FA, the fourth lens E4, the fifth lens E5, the sixth lens E6, the seventh lens E7, and the filter MF are placed in order from the object side of a photographic subject or the like, and an image of an object is formed behind the filter MF.

The first lens E1 is a negative meniscus lens that has a surface on the image side having a larger curvature than that on the object side, and a convex surface on the object side, and both surfaces of that are aspheric.

The second lens E2 is a negative lens of a biconcave lens that has a surface on the object side having a larger curvature than that on the image side.

The first lens E1 and the second lens E2 constitute a first F lens group S1F having a negative refractive power as a whole, and the first lens E1 corresponds to a first negative lens, and the second lens E2 corresponds to a second negative lens.

The third lens E3 is a positive lens of a biconvex lens that has a surface on the object side having a larger curvature than that on the image side. And in this case, the third lens E3 constitutes alone a first R lens group S1R having a positive refractive power.

That is, the first lens group G1 includes the first F lens group S1F having the negative refractive power of the first lens E1 and the second lens E2, and the first R lens group S1R having the positive refractive power of the third lens E3.

The fourth lens E4 is a positive lens of a biconvex lens, the fifth lens E5 is a negative lens of a biconcave lens, and the fourth lens E4 and the fifth lens E5 are cemented together integrally to form a cemented lens of two lenses.

The cemented lens of the fourth lens E4 and the fifth lens E5 constitute a second F lens group S2F that has a convex meniscus shape on the object side as a whole.

The sixth lens E6 is a negative meniscus lens that has a surface on the object side having a larger curvature than that on the image side, and a convex surface on the image side.

The sixth lens E6 constitutes a second M lens group S2M alone.

The seventh lens E7 is a positive meniscus lens that has a surface on the image side having a larger curvature than that on the object side and an aspheric and convex shape.

The seventh lens E7 constitutes a second R lens group S2R alone.

That is, the second lens group G2 includes the second F lens group S2F of the cemented lens of the fourth lens E4 and the fifth lens E5, the second M lens group S2M having the negative refractive power of the sixth lens E6, and the second R lens group S2R having the positive refractive power of the seventh lens E7.

As described above, in the image-forming lens according to the present invention, regarding focusing, a simple entire extension of the image-forming lens is not performed, and in a case of focusing on an object in the near distance, an interval between the first lens group G1 and the second lens group G2 is shortened compared with that in a state of focusing on an object at infinity.

In Example 2, since the aperture FA moves integrally with the first lens group G1, the interval between the first lens group G1 and the second lens group G2 is a sum of a fixed distance from a surface on the image side of the third lens E3 of the first lens group G1 to the aperture FA and a changeable interval DA between the aperture FA and the second lens group G2.

That is, in accordance with an entire extension of the image-forming lens by focusing on the object in the near distance from infinity (increase of a changeable interval DB between the second lens group G2 and the filter MF), the changeable interval DA between the aperture FA and the second lens group G2 is moved to be smaller than that in a state of focusing on the object at infinity, in the case of focusing on the object in the near distance.

In Example 2, each of a focal length of an entire system f, a smallest f-number F, and a half-field angle ω is as follows.

$f=18.29$ $F=2.52$ $\omega=38.2$

An optical characteristic of, each optical element is expressed in the following table.

TABLE 2

Optical characteristic

| SURFACE NUMBER | R | D | $N_d$ | $v_d$ | $P_{g,F}$ | GLASS NAME | | REMARKS | |
|---|---|---|---|---|---|---|---|---|---|
| 1* | 14.450 | 1.60 | 1.55332 | 71.68 | 0.5402 | HOYA M-FCD500 | E1 | S1F | G1 |
| 2* | 7.261 | 10.79 | | | | | | | |
| 3 | −30.101 | 1.20 | 1.59551 | 39.24 | 0.5803 | OHARA S-TIM8 | E2 | | |
| 4 | 460.622 | 0.10 | | | | | | | |
| 5 | 23.157 | 2.62 | 1.77250 | 49.60 | 0.5520 | OHARA S-LAH66 | E3 | S1R | |
| 6 | −34.926 | 2.00 | | | | | | | |
| 7 | APERTURE | CHANGEABLE INTERVAL DA | | | | | | FA | |
| 8 | 23.704 | 3.80 | 1.88300 | 40.76 | 0.5667 | OHARA S-LAH58 | E4 | S2F | G2 |
| 9 | −14.944 | 1.00 | 1.69895 | 30.13 | 0.6030 | OHARA S-TIM35 | E5 | | |
| 10 | 21.363 | 3.08 | | | | | | | |
| 11 | −11.593 | 1.22 | 1.92286 | 18.90 | 0.6495 | OHARA S-NPH2 | E6 | S2M | |
| 12 | −19.415 | 0.10 | | | | | | | |
| 13 | −345.929 | 3.41 | 1.82080 | 42.71 | 0.5642 | HOYA M-TAFD51 | E7 | S2R | |
| 14* | −19.332 | CHANGEABLE INTERVAL DB | | | | | | | |
| 15 | ∞ | 3.20 | 1.51680 | 64.20 | | FILTER | | MF | |
| 16 | ∞ | | | | | | | | |

Also in Table 3, an aspheric surface is expressed by a surface number with * (asterisk), and a name of a manufacturer of a glass material is expressed before a glass name, such as OHARA (OHARA INC.) and HOYA (HOYA CORPORATION).

That is, in Table 3, aspheric surfaces are a first surface, a second surface, and a 14th surface, and each aspheric surface parameter in [Expression 12] is as follows.

Aspheric Surface Parameter
Aspheric Surface of the First Surface $K=0.0$ $A_4=-1.15383\times 10^{-4}$ $A_6=2.38416\times 10^{-7}$ $A_8=-1.86497\times 10^{-9}$ Aspheric Surface of the Second Surface $K=-0.71833$ $A_4=-1.17671\times 10^{-5}$ $A_6=9.43499\times 10^{-7}$ $A_8=-4.64708\times 10^{-9}$ $A_{10}=7.05861\times 10^{-11}$ Aspheric Surface of the 14th Surface $K=-0.28312$ $A_4=6.41382\times 10^{-5}$ $A_6=2.15787\times 10^{-7}$ $A_8=-6.04112\times 10^{-10}$ $A_{10}=5.13609\times 10^{-12}$ The changeable interval DA between the aperture FA and the second lens group G2, and the changeable interval DB between the second lens group G2 and the filter MF are changed as described in the following table, in the case of focusing, in a state of focusing on the object at infinity, and in a state of focusing on the object in the near distance at an imaging magnification of $-\frac{1}{20}\times$.

TABLE 4

| | Changeable interval | |
|---|---|---|
| | INFINITY | $-\frac{1}{20}\times$ |
| DA | 5.720 | 5.370 |
| DB | 15.804 | 16.740 |

Values corresponding to the above-described Conditional expressions 1 to 14 in Example 2 are follows.

Values of Conditional expressions $L/Y'=3.95$ [1]

$(r_{21}+r_{22})/(r_{21}-r_{22})=-0.877$ [2]

$Bf/Y'=1.374$ [3]

$L_1/L=0.291$ [4]

$f_A/f_1=0.265$ [5]

$f_{1F}/f_{1R}=-0.861$ [6]

$A_{1F-1R}/L_1=-0.0061$ [7]

$n_d=1.553$ [8]

$v_d=71.7$ [9]

$P_{g,F}-(-0.001802\times v_d+0.6483)=0.0211$ [10]

$(A_{1-2M}-A_{1-2})/(Bf_M-Bf)=0.374$ [11]

$f_{2b}/f_2=-1.503$ [12]

$(r_{2bF}+r_{2bR})/(r_{2bF}-r_{2bR})=-3.96$ [13]

$(n_{d2b}=1.923$ [14]

Therefore, each value of the above-described Conditional expressions 1 to 14 in Example 2 is within a range of each conditional expression, and is satisfied with each of Conditional expressions 1 to 14.

Figure 5:
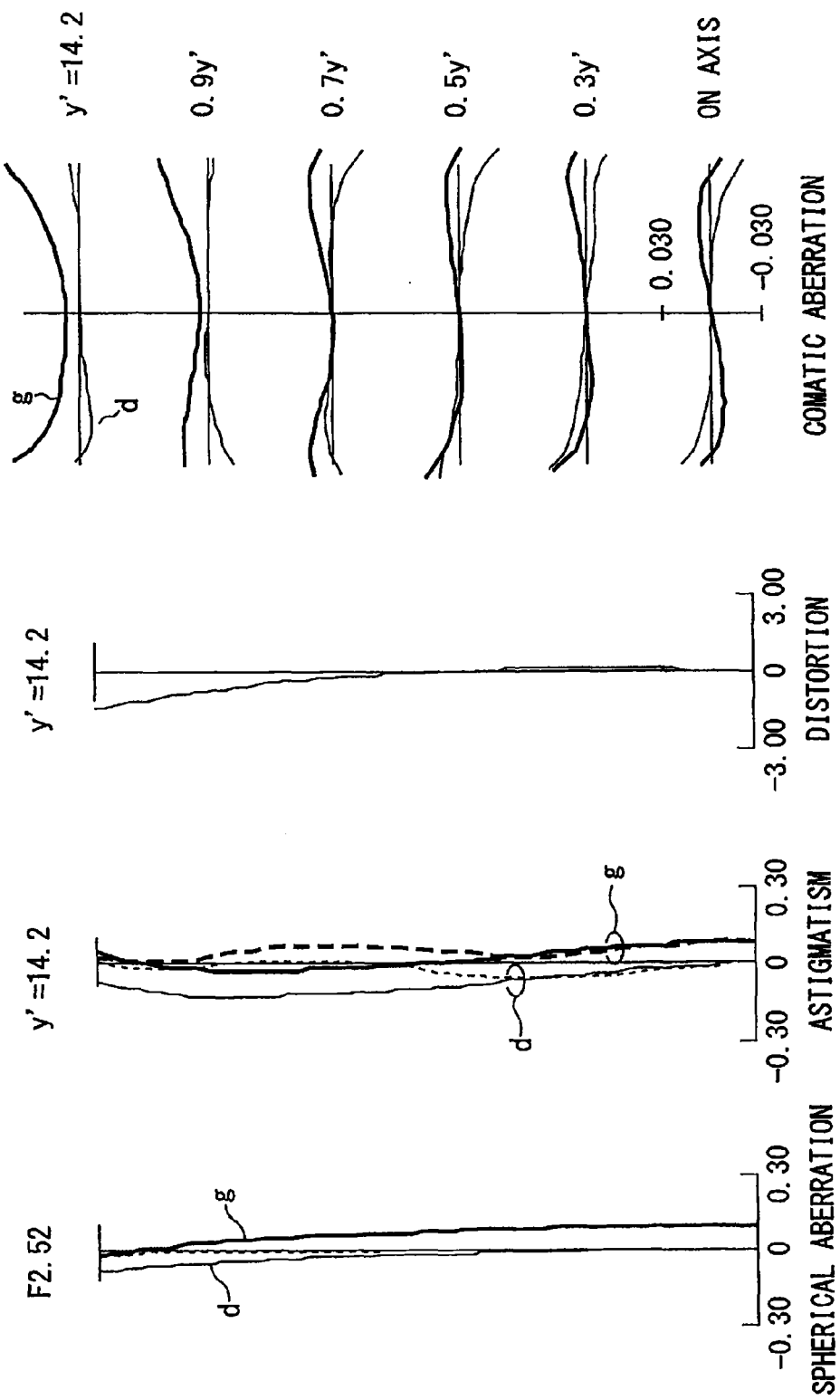
FIG. 5 illustrates aberration diagrams of spherical aberration, astigmatism, distortion, and comatic aberration in a state where the image-forming lens illustrated in FIG. 5 is focused on an object at infinity.
Figure 6:
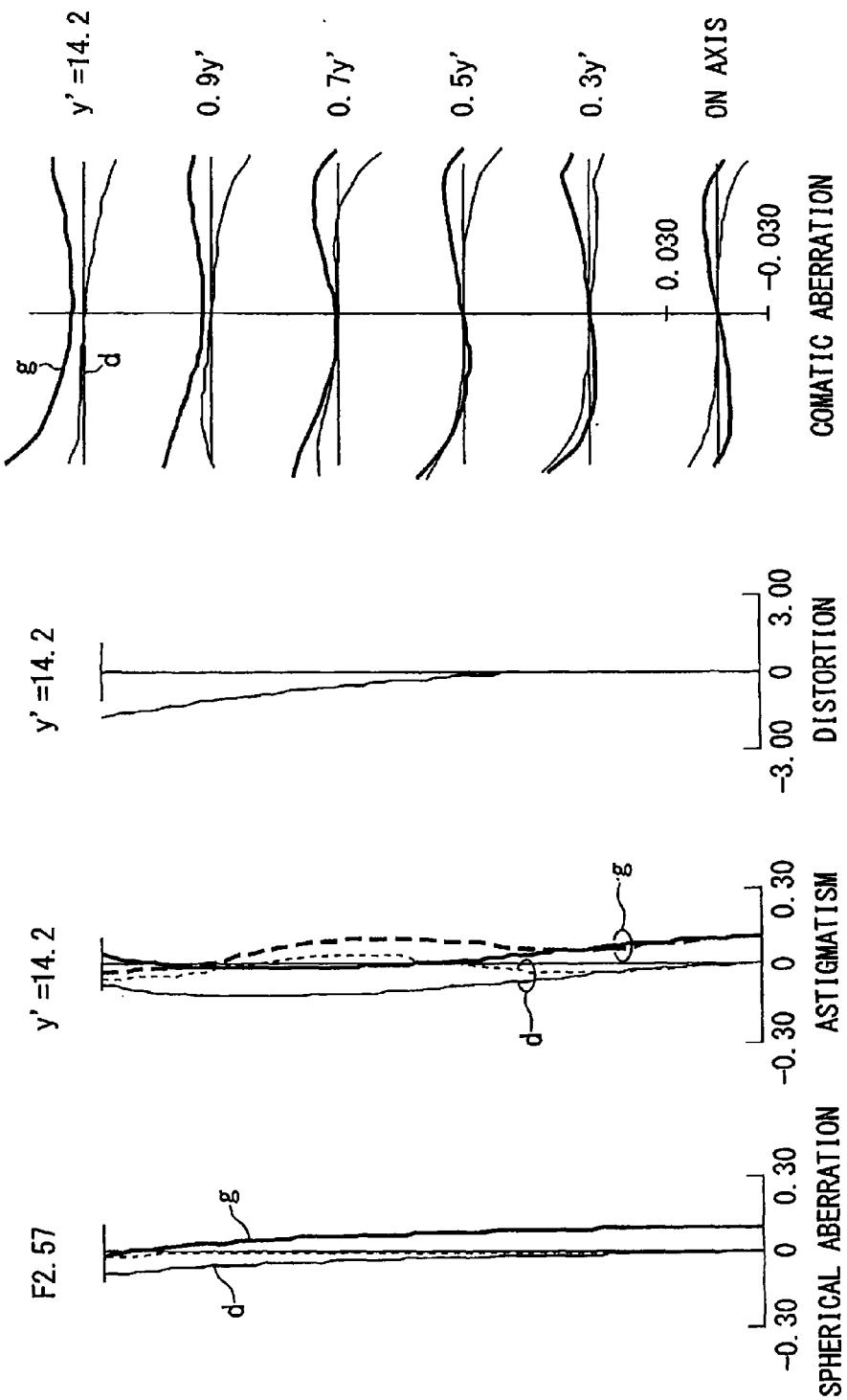
FIG. 6 illustrates aberration diagrams of spherical aberration, astigmatism, distortion, comatic aberration in a state where the image-forming lens illustrated in FIG. 4 is focused on the object in the near distance at $-\frac{1}{20}\times$.

FIG. 5 illustrates each aberration diagram of spherical aberration, astigmatism, distortion, and comatic aberration in a state where the image-forming lens according to Example 2 is focused on an object at infinity. And FIG. 6 illustrates each aberration diagram of spherical aberration, astigmatism, distortion, comatic aberration in a state where the image-forming lens according to Example 2 is focused on an object in the near distance at −1/20×.

In those aberration diagrams, a dashed-line in a spherical aberration diagram expresses a sine condition, a solid line in an astigmatism diagram expresses astigmatism in a sagittal plane, and a dashed-line in the astigmatism diagram expresses astigmatism in a meridional plane.

"g" and "d" in each aberration diagram of spherical aberration, astigmatism, and comatic aberration express a g-line, and a d-line, respectively.

Example 3

Figure 7:
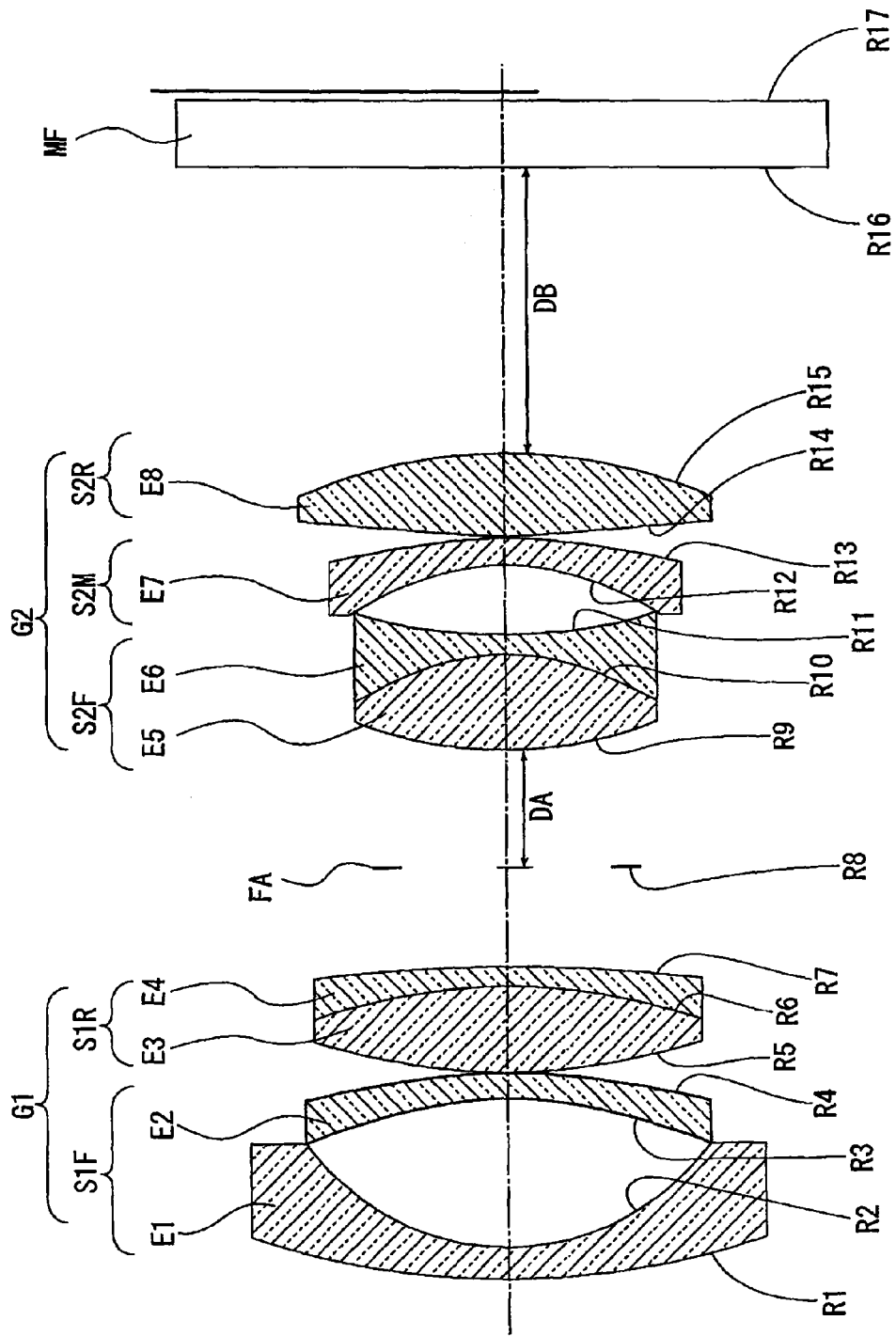
FIG. 7 is a schematic cross-sectional diagram along the optical axis illustrating a constitution of an optical system of an image-forming lens according to Example 3 of the present invention.

FIG. 7 is a schematic vertical cross-sectional diagram illustrating a constitution of an optical system of an image-forming lens according to Example 3 of the present invention.

The image-forming lens illustrated in FIG. 7 has a first lens E1, a second lens E2, a third lens E3, a fourth lens E4, a fifth lens E5, a sixth lens E6, a seventh lens E7, an eighth lens E8, an aperture FA, and a filter MF.

The first lens E1, the second lens E2, the third lens E3, and the fourth lens E4 constitute a first lens group G1, which is placed on an object side from the aperture FA. The fifth lens E5, the sixth lens E6, the seventh lens E7, and the eighth lens E8 constitute a second lens group G2, which is placed on an image plane (image) side from the aperture FA. Each of the lens groups is supported by a common supporting frame and so on per group, and in a case of focusing and the like, each lens group moves integrally.

In this case, the aperture FA moves integrally with the first lens group G1.

In FIG. 7, a surface number of each optical surface is also illustrated.

As described above, each reference sign in FIG. 7 is used independently per example; therefore if the same reference signs are used in each of FIGS. 1, 4, 10, and 13, each example does not always have a common constitution.

In FIG. 7, optical elements of an optical system of the image-forming lens, the first lens E1, the second lens E2, the third lens E3, the fourth lens E4, the aperture FA, the fifth lens E5, the sixth lens E6, the seventh lens E7, the eighth lens E8, and the filter MF are placed in order from the object side, and an image of an object is formed behind the filter MF.

The first lens E1 is a negative meniscus lens that has a surface on the image side having a larger curvature than that on the object side, and a convex surface on the object side, and both surfaces of that are aspheric.

The second lens E2 is a negative meniscus lens that has a surface on the object side having a larger curvature than that on the image side, and a convex surface on the image side.

The first lens E1 and the second lens E2 constitute a first F lens group S1F having a negative refractive power as a whole, and the first lens E1 corresponds to a first negative lens, and the second lens E2 corresponds to a second negative lens.

The third lens E3 is a positive lens of a biconvex lens that has a surface on the image side having a larger curvature than that on the object side. The fourth lens E4 is a negative meniscus lens that has a surface on the object side having a larger curvature than that on the image side, and a convex surface on the image side. The third lens E3 and the fourth lens E4 are cemented together integrally to form a cemented lens of two lenses.

The cemented lens of the third lens E3 and the fourth lens E4 is formed into a biconvex shape as a whole, and constitutes a first R lens group S1R having a positive refractive power.

That is, the first lens group G1 includes the first F lens group S1F having the negative refractive power of the first lens E1 and the second lens E2, and the first R lens group S1R having the positive refractive power of the third lens E3 and the fourth lens E4.

The fifth lens E5 is a positive lens of a biconvex lens, and the sixth lens E6 is a negative lens of a biconcave lens, and the fifth lens E5 and the sixth lens E6 are cemented together integrally to form a cemented lens of two lenses.

The cemented lens of the fifth lens E5 and the sixth lens E6 constitute a second F lens group S2F that has a negative meniscus shape on the object side as a whole.

The seventh lens E7 is a negative meniscus lens that has a surface on the object side having a larger curvature than that on the image side, and a convex surface on the image side.

The seventh lens E7 constitutes a second M lens group S2M alone.

The eighth lens E8 is a positive lens of a biconvex lens that has a surface on the image side having a larger curvature than that on the object side and an aspheric shape.

The eighth lens E8 constitutes a second R lens group S2R alone.

That is, the second lens group G2 includes the second F lens group S2F of the cemented lens of the fifth lens E5 and the sixth lens E6, the second M lens group S2M having the negative refractive power of the seventh lens E7, and the second R lens group S2R having the positive refractive power of the eighth lens E8.

As described above, in the image-forming lens according to the embodiment of the present invention, regarding focusing, a simple entire extension of the image-forming lens is not performed, and in a case of focusing on an object in the near distance, an interval between the first lens group G1 and the second lens group G2 is shortened compared with that in a state of focusing on an object at infinity.

In Example 3, since the aperture FA moves integrally with the first lens group G1, the interval between the first lens group G1 and the second lens group G2 is a sum of a fixed distance from a surface on the image side of the fourth lens E4 of the first lens group G1 to the aperture FA and a changeable interval DA between the aperture FA and the second lens group G2.

That is, in accordance with an entire extension of the image-forming lens by focusing on the object in the near distance from infinity (increase of a changeable interval DB between the second lens group G2 and the filter MF), the changeable interval DA between the aperture FA and the second lens group G2 is moved to be smaller than that in a state of focusing on the object at infinity, in the case of focusing on the object in the near distance.

In Example 3, each of a focal length of an entire system f, a smallest f-number F, and a half-field angle ω is as follows.

$f=18.30$ $F=2.52$ $\omega=38.2$ an optical characteristic of each optical element is expressed in the following table.

TABLE 5

Optical characteristic

| SURFACE NUMBER | R | D | $N_d$ | $v_d$ | $P_{g,F}$ | GLASS NAME | REMARKS | | |
|---|---|---|---|---|---|---|---|---|---|
| 1* | 28.690 | 1.60 | 1.61881 | 63.85 | 0.5416 | HOYA M-PCD4 | E1 | S1F | G1 |
| 2* | 10.000 | 7.02 | | | | | | | |
| 3 | −19.394 | 1.20 | 1.49700 | 81.54 | 0.5375 | OHARA S-FPL51 | E2 | | |
| 4 | −31.344 | 0.10 | | | | | | | |
| 5 | 29.273 | 3.96 | 1.88300 | 40.76 | 0.5667 | OHARA S-LAH58 | E3 | S1R | |
| 6 | −25.850 | 1.00 | 1.84666 | 23.78 | 0.6205 | OHARA S-TIH53 | E4 | | |
| 7 | −64.072 | 4.78 | | | | | | | |
| 8 | APERTURE | CHANGEABLE INTERVAL DA | | | | | FA | | |
| 9 | 19.818 | 4.45 | 1.88300 | 40.76 | 0.5667 | OHARA S-LAH58 | E5 | S2F | G2 |
| 10 | −11.751 | 1.00 | 1.68893 | 31.07 | 0.6004 | OHARA S-TIM28 | E6 | | |
| 11 | 19.256 | 3.36 | | | | | | | |
| 12 | −11.072 | 1.20 | 1.84666 | 23.78 | 0.6205 | OHARA S-TIH53 | E7 | S2M | |
| 13 | −27.188 | 0.10 | | | | | | | |
| 14 | 79.600 | 3.90 | 1.82080 | 42.71 | 0.5642 | HOYA M-TAFD51 | E8 | S2R | |
| 15* | −17.988 | CHANGEABLE INTERVAL DB | | | | | | | |
| 16 | ∞ | 3.20 | 1.51680 | 64.20 | | FILTER | MF | | |
| 17 | ∞ | | | | | | | | |

Also in Table 5, an aspheric surface is expressed by a surface number with * (asterisk), and a name of a manufacturer of a glass material is expressed before a glass name, such as OHARA (OHARA INC.) and HOYA (HOYA CORPORATION).

That is, in Table 5, aspheric surfaces are a first surface, a second surface, and a 15th surface, and each aspheric surface parameter in [Expression 12] is as follows.

Aspheric Surface Parameter
Aspheric Surface of the First Surface $K=0.0$ $A_4=-3.96377 \times 10^{-5}$ $A_6=9.21553 \times 10^{-8}$ Aspheric Surface of the Second Surface $K=-0.59156$ $A_4=-8.37359 \times 10^{-6}$ $A_6=3.49291 \times 10^{-7}$ $A_8=-5.31443 \times 10^{-9}$ $A_{10}=5.50904 \times 10^{-11}$ Aspheric Surface of the 15th Surface $K=-0.56176$ $A_4=7.57070 \times 10^{-5}$ $A_6=3.27942 \times 10^{-7}$ $A_8=-1.51207 \times 10^{-9}$ $A_{10}=9.93156 \times 10^{-12}$ The changeable interval DA between the aperture FA and the second lens group G2, and the changeable interval DB between the second lens group G2 and the filter MF are changed as described in the following table, in the case of focusing, in a state of focusing on the object at infinity, and in a state of focusing on the object in the near distance at an imaging magnification of −1/20×.

TABLE 6

| | Changeable interval | |
|---|---|---|
| | INFINITY | −1/20× |
| DA | 5.440 | 5.000 |
| DB | 13.497 | 14.422 |

Values corresponding to the above-described Conditional expressions 1 to 14 in Example 3 are as follows.

Values of Conditional expressions $L/Y'=3.97$ [1]

$(r_{21}+r_{22})/(r_{21}-r_{22})=-4.268$ [2]

$Bf/Y'=1.211$ [3]

$L_1/L=0.264$ [4]

$f_A/f_1=0.163$ [5]

$f_{1F}/f_{1R}=-0.867$ [6]

$A_{1F-1R}/L_1=-0.0067$ [7]

$n_d=1.497$ [8]

$v_d=81.5$ [9]

$P_{g,F}-(-0.001802 \times v_d + 0.6483)=0.0361$ [10]

$(A_{1-2M}-A_{1-2})/(Bf_M-Bf)=0.476$ [11]

$f_{2b}/f_2=-0.871$ [12]

$(r_{2bF}+r_{2bR})/(r_{2bF}-r_{2bR})=-2.37$ [13]

$(n_{d2b})=1.847$ [14]

Therefore, each value of the above-described Conditional expressions 1 to 14 in Example 3 is within a range of each conditional expression, and is satisfied with each of Conditional expressions 1 to 14.

Figure 8:
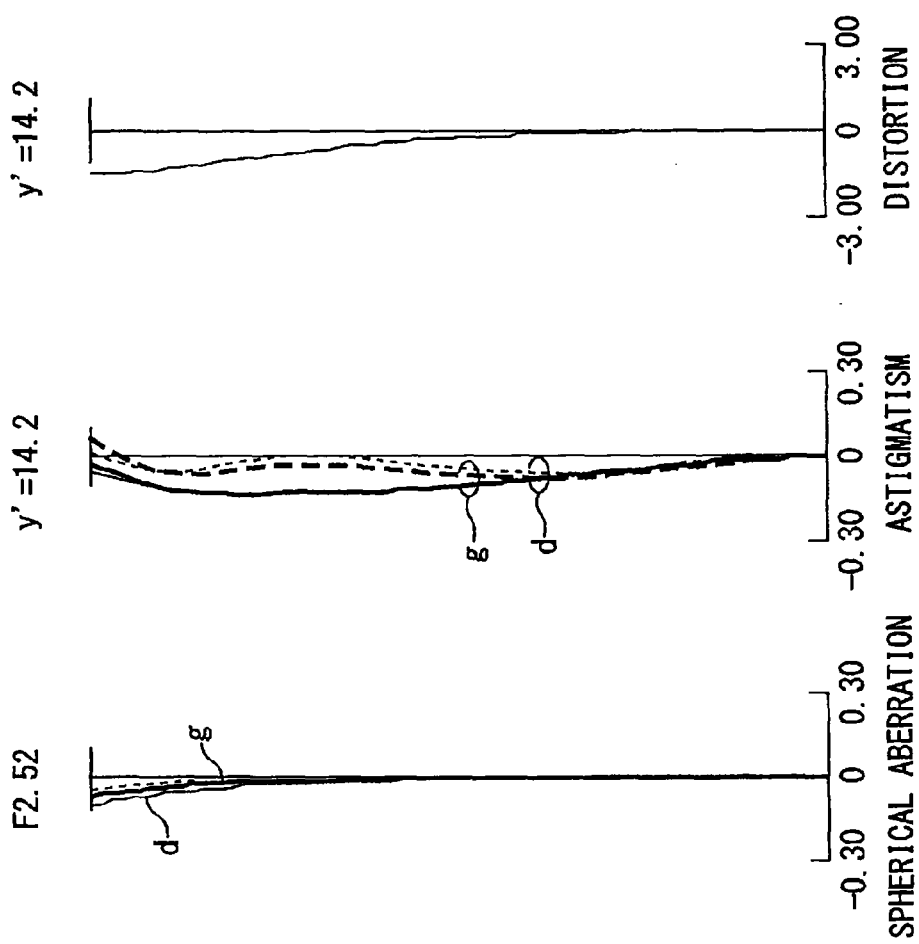
FIG. 8 illustrates aberration diagrams of spherical aberration, astigmatism, distortion, and comatic aberration in a state where the image-forming lens illustrated in FIG. 7 is focused on an object at infinity.

FIG. 8 illustrates each aberration diagram of spherical aberration, astigmatism, distortion, and comatic aberration in a state where the image-forming lens according to Example 3 is focused on an object at infinity. And FIG. 9 illustrates each aberration diagram of spherical aberration, astigmatism, distortion, comatic aberration in a state where the image-forming lens according to Example 3 is focused on an object in the near distance at −1/20×.

In those aberration diagrams, a dashed-line in a spherical aberration diagram expresses a sine condition, a solid line in an astigmatism diagram expresses astigmatism in a sagittal plane, and a dashed-line in the astigmatism diagram expresses astigmatism in a meridional plane.

"g" and "d" in each aberration diagram of spherical aberration, astigmatism, and comatic aberration express a g-line, and a d-line, respectively.

Example 4

Figure 10:
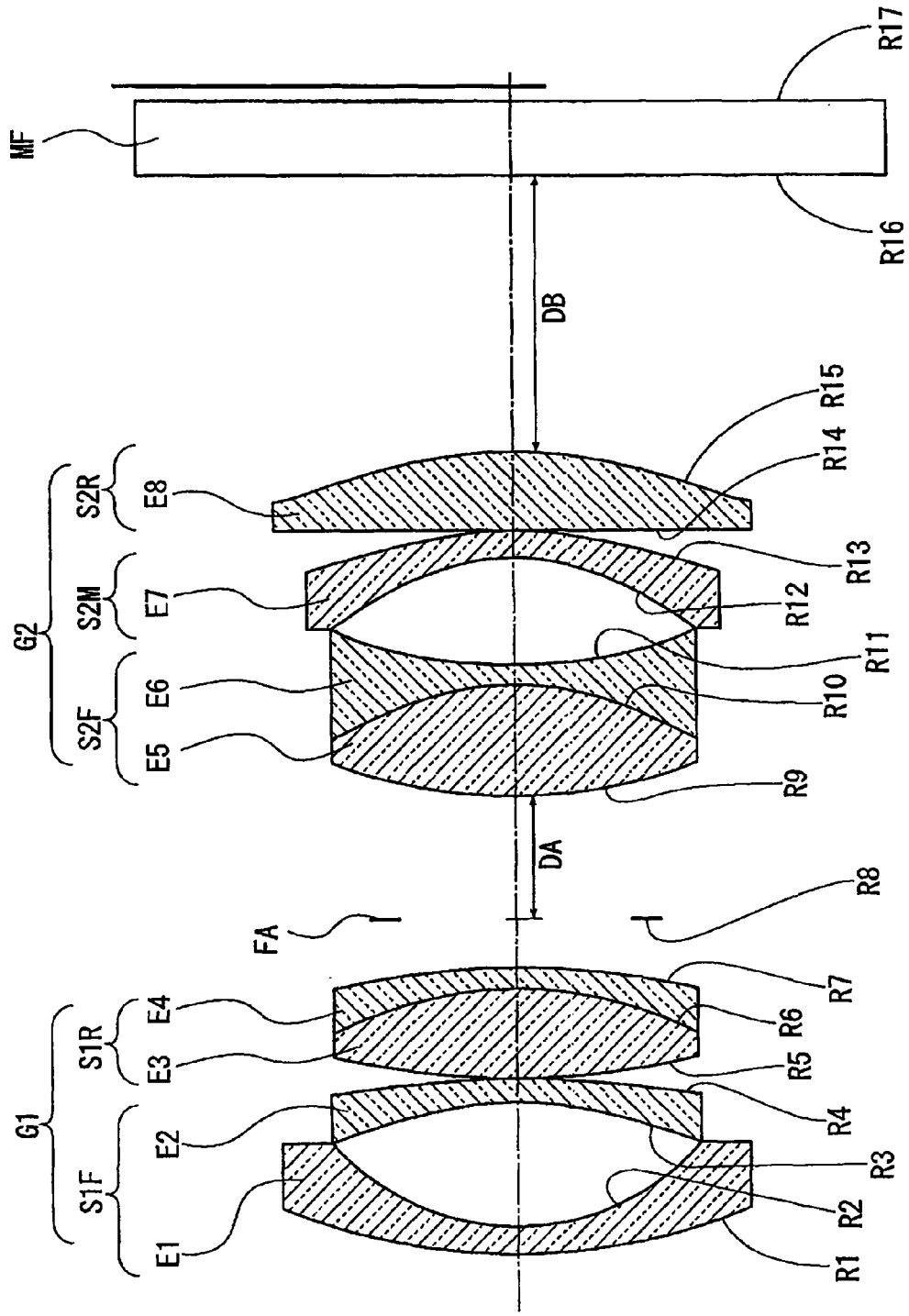
FIG. 10 is a schematic cross-sectional diagram along the optical axis illustrating a constitution of an optical system of an image-forming lens according to Example 4 of the present invention.

FIG. 10 is a schematic vertical cross-sectional diagram illustrating a constitution of an optical system of an image-forming lens according to Example 4 of the present invention.

The image-forming lens illustrated in FIG. 10 has a first lens E1, a second lens E2, a third lens E3, a fourth lens E4, a fifth lens E5, a sixth lens E6, a seventh lens E7, an eighth lens E8, an aperture FA, and a filter MF.

The first lens E1, the second lens E2, the third lens E3, and the fourth lens E4 constitute a first lens group G1, which is placed on an object side from the aperture FA. The fifth lens E5, the sixth lens E6, the seventh lens E7, and the eighth lens E8 constitute a second lens group G2, which is placed on an image plane (image) side from the aperture FA. Each of the lens groups is supported by a common supporting frame and so on per group, and in a case of focusing and the like, each lens group moves integrally.

Also in this case, the aperture FA moves integrally with the first lens group G1.

In FIG. 10, a surface number of each optical surface is also illustrated.

As described above, each reference sign in FIG. 10 is used independently per example; therefore if the same reference signs are used in each of FIGS. 1, 4, 7, and 13, each example does not always have a common constitution.

In FIG. 10, optical elements of an optical system of the image-forming lens, the first lens E1, the second lens E2, the third lens E3, the fourth lens E4, the aperture FA, the fifth lens E5, the sixth lens E6, the seventh lens E7, the eighth lens E8, and the filter MF are placed in order from the object side, and an image of an object is formed behind the filter MF.

The first lens E1 is a negative meniscus lens that has a surface on the image side having a larger curvature than that on the object side, and a convex surface on the object side, and both surfaces of that are aspheric.

The second lens E2 is a negative meniscus lens that has a surface on the object side having a larger curvature than that on the image side, and a convex surface on the image side.

The first lens E1 and the second lens E2 constitute a first F lens group S1F having a negative refractive power as a whole, and the first lens E1 corresponds to a first negative lens and the second lens E2 corresponds to a second negative lens.

The third lens E3 is a positive lens of a biconvex lens that has a surface on the image side having a larger curvature than that on the object side. The fourth lens E4 is a negative meniscus lens that has a surface on the object side having a larger curvature than that on the image side, and a convex surface on the image side. The third lens E3 and the fourth lens E4 are cemented together integrally to form a cemented lens of two lenses.

The cemented lens of the third lens E3 and the fourth lens E4 is formed into a biconvex shape as a whole, and constitutes a first R lens group S1R having a positive refractive power.

That is, the first lens group G1 includes the first F lens group S1F having the negative refractive power of the first lens E1 and the second lens E2, and the first R lens group S1R having the positive refractive power of the third lens E3 and the fourth lens E4.

The fifth lens E5 is a positive lens of a biconvex lens, and the sixth lens E6 is a negative lens of a biconcave lens, and the fifth lens E5 and the sixth lens E6 are cemented together integrally to form a cemented lens of two lenses.

The cemented lens of the fifth lens E5 and the sixth lens E6 constitutes a second F lens group S2F that has a convex meniscus shape on the object side as a whole.

The seventh lens E7 is a negative meniscus lens that has a surface on the object side having a larger curvature than that on the image side, and a convex surface on the image side.

The seventh lens E7 constitutes a second M lens group S2M alone.

The eighth lens E8 is a positive lens of a biconvex lens that has a surface on the image side having a larger curvature than that on the object side and an aspheric shape.

The eighth lens E8 constitutes a second R lens group S2R alone.

That is, the second lens group G2 includes the second F lens group S2F of the cemented lens of the fifth lens E5 and the sixth lens E6, the second M lens group S2M having the negative refractive power of the seventh lens E7, and the second R lens group S2R having the positive refractive power of the eighth lens E8.

As described above, in the image-forming lens according to the embodiment of the present invention, regarding focusing, a simple entire extension of the image-forming lens is not performed, and in a case of focusing on an object in the near distance, an interval between the first lens group G1 and the second lens group G2 is shortened compared with that in a state of focusing on an object at infinity.

In Example 4, since the aperture FA moves integrally with the first lens group G1, the interval between the first lens group G1 and the second lens group G2 is a sum of a fixed distance from a surface on the image side of the fourth lens E4 of the first lens group G1 to the aperture FA and a changeable interval DA between the aperture FA and the second lens group G2.

That is, in accordance with an entire extension of the image-forming lens by focusing on the object in the near distance from infinity (increase of a changeable interval DB between the second lens group G2 and the filter MF), the changeable interval DA between the aperture FA and the second lens group G2 is moved to be smaller than that in a state of focusing on the object at infinity, in the case of focusing on the object in the near distance.

In Example 4, each of a focal length of an entire system f, a smallest f-number F, and a half-field angle ω is as follows.

$f=18.29$ $F=2.55$ $\omega=38.3$ an optical characteristic of each optical element is expressed in the following table.

TABLE 7

Optical characteristic

| SURFACE NUMBER | R | D | $N_d$ | $v_d$ | $P_{g,F}$ | GLASS NAME | REMARKS | | |
|---|---|---|---|---|---|---|---|---|---|
| 1* | 22.274 | 1.20 | 1.61881 | 63.85 | 0.5416 | HOYA M-PCD4 | E1 | S1F | G1 |
| 2* | 9.524 | 5.26 | | | | | | | |
| 3 | −15.506 | 0.80 | 1.49700 | 81.54 | 0.5375 | OHARA S-FPL51 | E2 | | |
| 4 | −47.476 | 0.10 | | | | | | | |
| 5 | 30.115 | 3.84 | 1.88300 | 40.76 | 0.5667 | OHARA S-LAH58 | E3 | S1R | |
| 6 | −13.728 | 0.70 | 1.84666 | 23.78 | 0.6205 | OHARA S-TIH53 | E4 | | |
| 7 | −32.069 | 2.10 | | | | | | | |
| 8 | APERTURE | CHANGEABLE INTERVAL DA | | | | | FA | | |
| 9 | 20.592 | 4.59 | 1.88300 | 40.76 | 0.5667 | OHARA S-LAH58 | E5 | S2F | G2 |
| 10 | −12.134 | 0.80 | 1.64769 | 33.79 | 0.5938 | OHARA S-TIM22 | E6 | | |
| 11 | 18.982 | 4.25 | | | | | | | |
| 12 | −10.030 | 1.09 | 1.92286 | 18.90 | 0.6495 | OHARA S-NPH2 | E7 | S2M | |
| 13 | −19.345 | 0.10 | | | | | | | |
| 14 | 2966.881 | 3.18 | 1.85400 | 40.39 | 0.5677 | OHARA L-LAH85 | E8 | S2R | |
| 15* | −16.546 | CHANGEABLE INTERVAL DB | | | | | | | |
| 16 | ∞ | 3.20 | 1.51680 | 64.20 | | FILTER | MF | | |
| 17 | ∞ | | | | | | | | |

Also in Table 7, an aspheric surface is expressed by a surface number with * (asterisk), and a name of a manufacturer of a glass material is expressed before a glass name, such as OHARA (OHARA INC.) and HOYA (HOYA CORPORATION).

That is, in Table 7, aspheric surfaces are a first surface, a second surface, and a 15th surface, and each aspheric surface parameter in [Expression 12] is as follows.

Aspheric Surface Parameter
Aspheric Surface of the First Surface $K=0.0$ $A_4=5.51335\times10^{-6}$ $A_6=-2.26669\times10^{-7}$ Aspheric Surface of the Second Surface $K=0.25063$ $A_4=-4.96155\times10^{-5}$ $A_6=9.77362\times10^{-7}$ $A_8=-3.89927\times10^{-8}$ $A_{10}=-3.82203\times10^{-10}$ $A_{12}=1.87953\times10^{-11}$ $A_{14}=-2.16473\times10^{-13}$ Aspheric Surface of the 15th Surface $K=0.0$ $A_4=1.07649\times10^{-4}$ $A_6=-1.45102\times10^{-6}$ $A_8=6.57063\times10^{-8}$ $A_{10}=-1.20942\times10^{-9}$ $A_{12}=9.40772\times10^{-12}$ $A_{14}=2.04652\times10^{-14}$ $A_{16}=-7.56483\times10^{-16}$ $A_{18}=3.26908\times10^{-18}$ The changeable interval DA between the aperture FA and the second lens group G2, and the changeable interval DB between the second lens group G2 and the filter MF are changed as described in the following table, in the case of focusing, in a state of focusing on the object at infinity, and in a state of focusing on the object in the near distance at an imaging magnification of $-1/20\times$.

TABLE 8

| | INFINITY | $-1/20\times$ |
|---|---|---|
| DA | 5.410 | 5.100 |
| DB | 11.466 | 12.393 |

Values corresponding to the above-described Conditional expressions 1 to 14 in Example 4 are as follows.

Values of Conditional expressions $L/Y'=3.42$ [1]

$(r_{21}+r_{22})/(r_{21}-r_{22})=-1.970$ [2]

$Bf/Y'=1.068$ [3]

$L_1/L=0.245$ [4]

$f_A/f_1=0.217$ [5]

$f_{1F}/f_{1R}=-0.928$ [6]

$A_{1F-1R}/L_1=-0.0084$ [7]

$n_d=1.497$ [8]

$v_d=81.5$ [9]

$P_{g,F}-(-0.001802\times v_d+0.6483)=0.0361$ [10]

$(A_{1-2M}-A_{1-2})/(Bf_M-Bf)=0.334$ [11]

$f_{2b}/f_2=-0.919$ [12]

$(r_{2bF}+r_{2bR})/(r_{2bF}-r_{2bR})=-3.15$ [13]

$(n_{d2b}=1.923$ [14]

Therefore, each value of the above-described Conditional expressions 1 to 14 in Example 4 is within a range of each conditional expression, and is satisfied with each of Conditional expressions 1 to 14.

Figure 11:
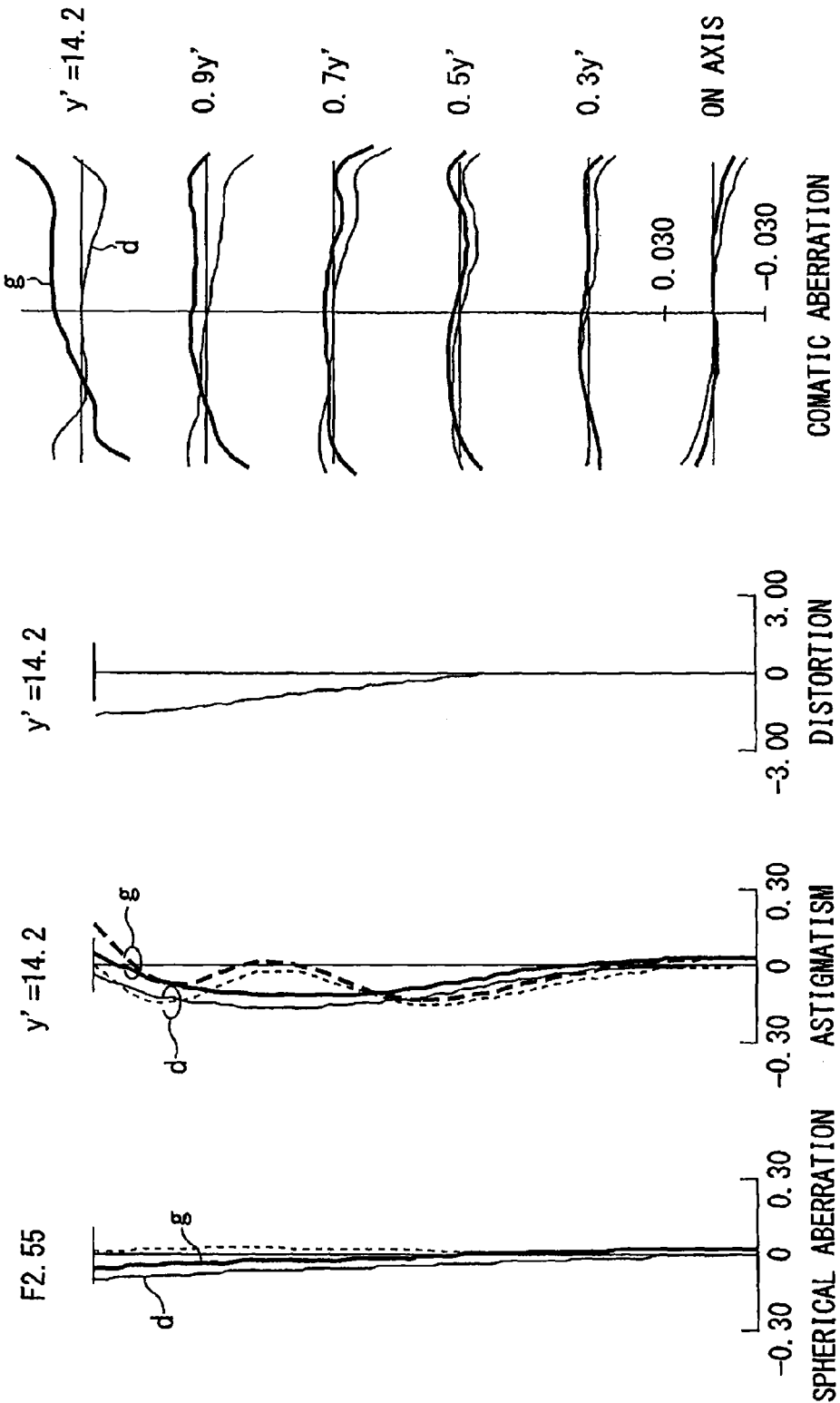
FIG. 11 illustrates aberration diagrams of spherical aberration, astigmatism, distortion, and comatic aberration in a state where the image-forming lens illustrated in FIG. 10 is focused on an object at infinity.

FIG. 11 illustrates each aberration diagram of spherical aberration, astigmatism, distortion, and comatic aberration in a state where the image-forming lens according to Example 4 is focused on an object at infinity. And FIG. 12 illustrates each aberration diagram of spherical aberration, astigmatism, distortion, comatic aberration in a state where the image-forming lens according to Example 4 is focused on an object in the near distance at −1/20×.

In those aberration diagrams, a dashed-line in a spherical aberration diagram expresses a sine condition, a solid line in an astigmatism diagram expresses astigmatism in a sagittal plane, and a dashed-line in the astigmatism diagram expresses astigmatism in a meridional plane.

"g" and "d" in each aberration diagram of spherical aberration, astigmatism, and comatic aberration express a g-line, and a d-line, respectively.

Example 5

Figure 13:
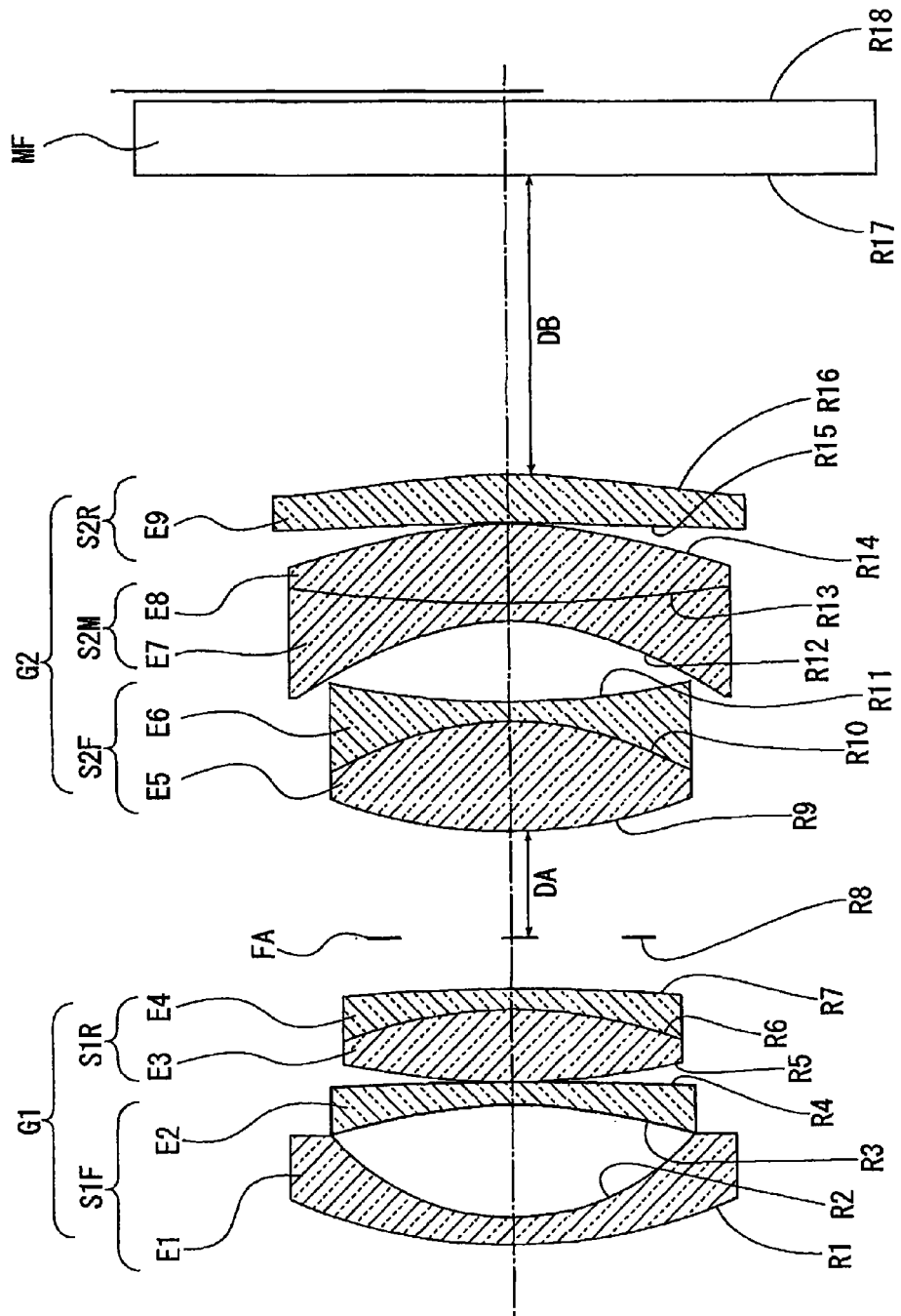
FIG. 13 is a schematic cross-sectional diagram along the optical axis illustrating a constitution of an optical system of an image-forming lens according to Example 5 of the present invention.

FIG. 13 is a schematic vertical cross-sectional diagram illustrating a constitution of an optical system of an image-forming lens according to Example 5 of the present invention.

The image-forming lens illustrated in FIG. 13 has a first lens E1, a second lens E2, a third lens E3, a fourth lens E4, a fifth lens E5, a sixth lens E6, a seventh lens E7, an eighth lens E8, a ninth lens E9, an aperture FA, and a filter MF.

The first lens E1, the second lens E2, the third lens E3, and the fourth lens E4 constitute a first lens group G1, which is placed on an object side from the aperture FA. The fifth lens E5, the sixth lens E6, the seventh lens E7, the eighth lens E8, and the ninth lens E9 constitute a second lens group G2, which is placed on an image plane (image) side from the aperture FA. Each of the lens groups is supported by a common supporting frame and so on per group, and in a case of focusing and the like, each lens group moves integrally.

In this case, the aperture FA moves integrally with the first lens group G1.

In FIG. 13, optical elements of an optical system of the image-forming lens, the first lens E1, the second lens E2, the third lens E3, the fourth lens E4, the aperture FA, the fifth lens E5, the sixth lens E6, the seventh lens E7, the eighth lens E8, the ninth lens E9, and the filter MF are placed in order from the object side, and an image of an object is formed behind the filter MF.

The first lens E1 is a negative meniscus lens that has a surface on the image side having a larger curvature than that on the object side, and a convex surface on the object side, and the surface on the image side is aspheric.

The second lens E2 is a negative meniscus lens that has a surface on the object side having a larger curvature than that on the image side, and a convex surface on the image side.

The first lens E1 and the second lens E2 constitute a first F lens group S1F having a negative refractive power as a whole, and the first lens E1 corresponds to a first negative lens and the second lens E2 corresponds to a second negative lens.

The third lens E3 is a positive lens of a biconvex lens that has a surface on the image side having a larger curvature than that on the object side. The fourth lens E4 is a negative meniscus lens that has a surface on the object side having a larger curvature than that on the image side, and a convex surface on the image side. The third lens E3 and the fourth lens E4 are cemented together integrally to form a cemented lens of two lenses.

The cemented lens of the third lens E3 and the fourth lens E4 is formed into a biconvex shape as a whole, and constitutes a first R lens group S1R having a positive refractive power.

That is, the first lens group G1 includes the first F lens group S1F having the negative refractive power of the first lens E1 and the second lens E2, and the first R lens group S1R having the positive refractive power of the third lens E3 and the fourth lens E4.

The fifth lens E5 is a positive lens of a biconvex lens, and the sixth lens E6 is a negative lens of a biconcave lens, and the fifth lens E5 and the sixth lens E6 are cemented together integrally to form a cemented lens of two lenses.

The cemented lens of the fifth lens E5 and the sixth lens E6 constitute a second F lens group S2F that has a convex meniscus shape on the object side as a whole.

The seventh lens E7 is a negative lens of a biconcave lens that has a surface on the object side having a larger curvature than that on the image side. The eighth lens E8 is a positive lens of a biconvex lens that has a surface on the image side having a larger curvature than that on the object side. The seventh lens E7 and the eighth lens E8 are cemented together integrally to form a cemented lens of two lenses.

The cemented lens of the seventh lens E7 and the eighth lens E8 that has a convex surface on the image side and a negative meniscus shape as a whole, and constitutes a second M lens group S2M having a negative refractive power.

The ninth lens E9 is a positive meniscus lens that has a surface on the image side having a larger curvature than that on the object side and an aspheric and convex shape.

The ninth lens E9 constitutes a second R lens group S2R alone.

That is, the second lens group G2 includes the second F lens group S2F of the cemented lens of the fifth lens E5 and the sixth lens E6, the second M lens group S2M having the negative refractive power of the cemented lens of the seventh lens E7 and the eighth lens E8, and the second R lens group S2R having a positive refractive power of the ninth lens E9.

As described above, in the image-forming lens according to the present invention, regarding focusing, a simple entire extension of the image-forming lens is not performed, and in a case of focusing on an object in the near distance, an interval between the first lens group G1 and the second lens group G2 is shortened compared with that in a state of focusing on an object at infinity.

In Example 5, since the aperture FA moves integrally with the first lens group G1, the interval between the first lens group G1 and the second lens group G2 is a sum of a fixed distance from a surface on the image side of the fourth lens E4 of the first lens group G1 to the aperture FA and a changeable interval DA between the aperture FA and the second lens group G2.

That is, in accordance with an entire extension of the image-forming lens by focusing on the object in the near distance from infinity (increase of a changeable interval DB between the second lens group G2 and the filter MF), the changeable interval DA between the aperture FA and the second lens group G2 is moved to be smaller than that in a state of focusing on the object at infinity, in the case of focusing on the object in the near distance.

In Example 5, each of a focal length of an entire system f, a smallest f-number F, and a half-field angle ω are as follows.

$f=18.30$ $F=2.56$ $\omega=38.2$

An optical characteristic of each optical element is expressed in the following table.

The changeable interval DA between the aperture FA and the second lens group G2, and the changeable interval DB between the second lens group G2 and the filter MF are changed as described in the following table, in the case of focusing, in a state of focusing on the object at infinity, and in a state of focusing on the object in the near distance at an imaging magnification of $-\frac{1}{20}\times$.

TABLE 9

Optical characteristic

| SURFACE NUMBER | R | D | $N_d$ | $v_d$ | $P_{g,F}$ | GLASS NAME | | REMARKS | |
|---|---|---|---|---|---|---|---|---|---|
| 1 | 20.090 | 1.20 | 1.61881 | 63.85 | 0.5416 | HOYA M-PCD4 | E1 | S1F | G1 |
| 2* | 9.524 | 4.83 | | | | | | | |
| 3 | −18.555 | 0.80 | 1.49700 | 81.54 | 0.5375 | OHARA S-FPL51 | E2 | | |
| 4 | −331.232 | 0.10 | | | | | | | |
| 5 | 24.844 | 3.14 | 1.88300 | 40.76 | 0.5667 | OHARA S-LAH58 | E3 | S1R | |
| 6 | −16.981 | 0.80 | 1.84666 | 23.78 | 0.6205 | OHARA S-TIH53 | E4 | | |
| 7 | −57.153 | 2.10 | | | | | | | |
| 8 | APERTURE | CHANGEABLE INTERVAL DA | | | | | | FA | |
| 9 | 19.843 | 4.51 | 1.88300 | 40.76 | 0.5667 | OHARA S-LAH58 | E5 | S2F | G2 |
| 10 | −13.620 | 0.80 | 1.62004 | 36.26 | 0.5879 | OHARA S-TIM2 | E6 | | |
| 11 | 29.999 | 3.43 | | | | | | | |
| 12 | −12.853 | 0.80 | 1.84666 | 23.78 | 0.6205 | OHARA S-TIH53 | E7 | S2F | |
| 13 | 62.695 | 3.26 | 1.88300 | 40.76 | 0.5667 | OHARA S-LAH58 | E8 | | |
| 14 | −21.946 | 0.10 | | | | | | | |
| 15 | −166.052 | 2.13 | 1.85400 | 40.39 | 0.5677 | OHARA L-LAH85 | E9 | S2R | |
| 16* | −26.786 | CHANGEABLE INTERVAL DB | | | | | | | |
| 17 | ∞ | 3.20 | 1.51680 | 64.20 | | FILTER | | MF | |
| 18 | ∞ | | | | | | | | |

Also in Table 9, an aspheric surface is expressed by a surface number with * (asterisk), and a name of a manufacturer of a glass material is expressed before a glass name, such as OHARA (OHARA INC.) and HOYA (HOYA CORPORATION).

That is, in Table 9, aspheric surfaces are, a second surface, and a 16th surface, and each aspheric surface parameter in [Expression 12] is as follows. Aspheric surface parameter Aspheric Surface of the Second Surface $K=-0.19254$ $A_4=2.29237\times10^{-5}$ $A_6=1.87839\times10^{-7}$ $A_8=1.69982\times10^{-8}$ $A_{10}=-4.09939\times10^{-10}$ $A_{12}=5.19254\times10^{-12}$ Aspheric Surface of the 16th Surface $K=0.0$ $A_4=8.53049\times10^{-5}$ $A_6=-1.65776\times10^{-7}$ $A_8=1.06167\times10^{-8}$ $A_{10}=-1.01522\times10^{-10}$ $A_{12}=4.07983\times10^{-13}$

TABLE 10

| Changeable interval | | |
|---|---|---|
| | INFINITY | $-\frac{1}{20}\times$ |
| DA | 4.580 | 4.250 |
| DB | 12.438 | 13.353 |

Values corresponding to the above-described Conditional expressions 1 to 14 in Example 5 are follows.

Values of Conditional Expressions $L/Y'=3.43$ [1]

$(r_{21}+r_{22})/(r_{21}-r_{22})=-1.119$ [2]

$Bf/Y'=1.136$ [3]

$L_1/L=0.223$ [4]

$f_A/f_1=0.183$ [5]

$f_{1F}/f_{1R}=-0.836$ [6]

$A_{1F-1R}/L_1=-0.0092$ [7]

$n_d=1.497$ [8]

$v_d=81.5$ [9]

$P_{g,F}-(-0.001802\times v_d+0.6483)=0.0361$ [10]

$(A_{1-2M}-A_{1-2})/(Bf_M-Bf)=0.361$ [11]

$f_{2b}/f_2=-2.305$ [12]

$$(r_{2bF}+r_{2bR})/(r_{2bF}-r_{2bR})=-3.83 \quad [13]$$

$$(n_{d2b}=1.865 \quad [14]$$

Therefore, each value of the above-described Conditional expressions 1 to 14 in Example 5 is within a range of each conditional expression, and is satisfied with each of Conditional expressions 1 to 14.

Figure 14:
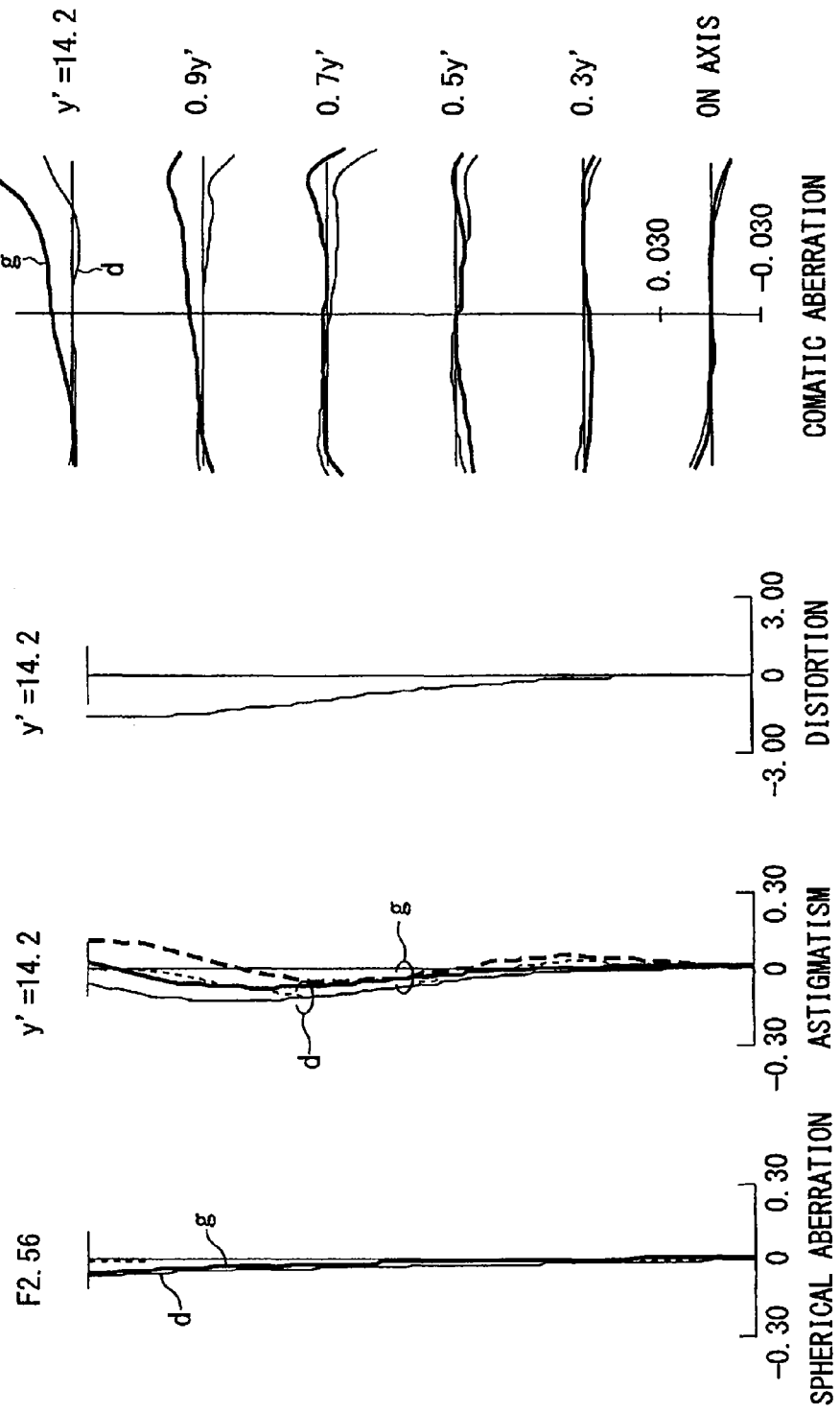
FIG. 14 illustrates aberration diagrams of spherical aberration, astigmatism, distortion, and comatic aberration in a state where the image-forming lens according to Example 5 illustrated in FIG. 13 is focused on an object at infinity.
Figure 15:
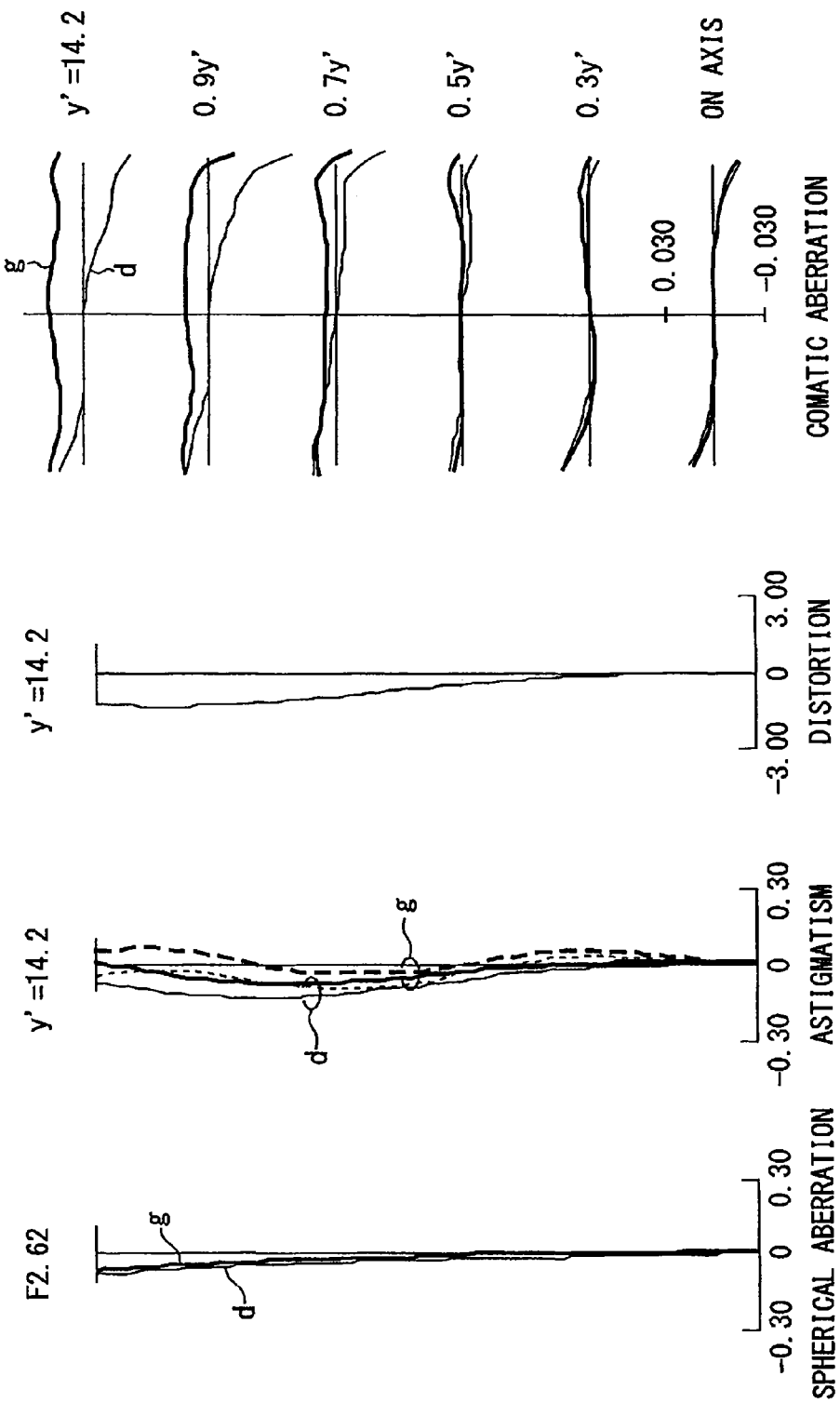
FIG. 15 illustrates aberration diagrams of spherical aberration, astigmatism, distortion, comatic aberration in a state where the image-forming lens according to Example 5 illustrated in FIG. 13 is focused on the object in the near distance at $-\frac{1}{20}\times$.

FIG. 14 illustrates each aberration diagram of spherical aberration, astigmatism, distortion, and comatic aberration in a state where the image-forming lens according to Example 5 is focused on an object at infinity. And FIG. 15 illustrates each aberration diagram of spherical aberration, astigmatism, distortion, comatic aberration in a state where the image-forming lens according to Example 5 is focused on an object in the near distance at $-\frac{1}{20}\times$.

In those aberration diagrams, a dashed-line in a spherical aberration diagram expresses a sine condition, a solid line in an astigmatism diagram expresses astigmatism in a sagittal plane, and a dashed-line in the astigmatism diagram expresses astigmatism in a meridional plane.

"g" and "d" in each aberration diagram of spherical aberration, astigmatism, and comatic aberration express a g-line, and a d-line, respectively.

Example 6

Figure 16:
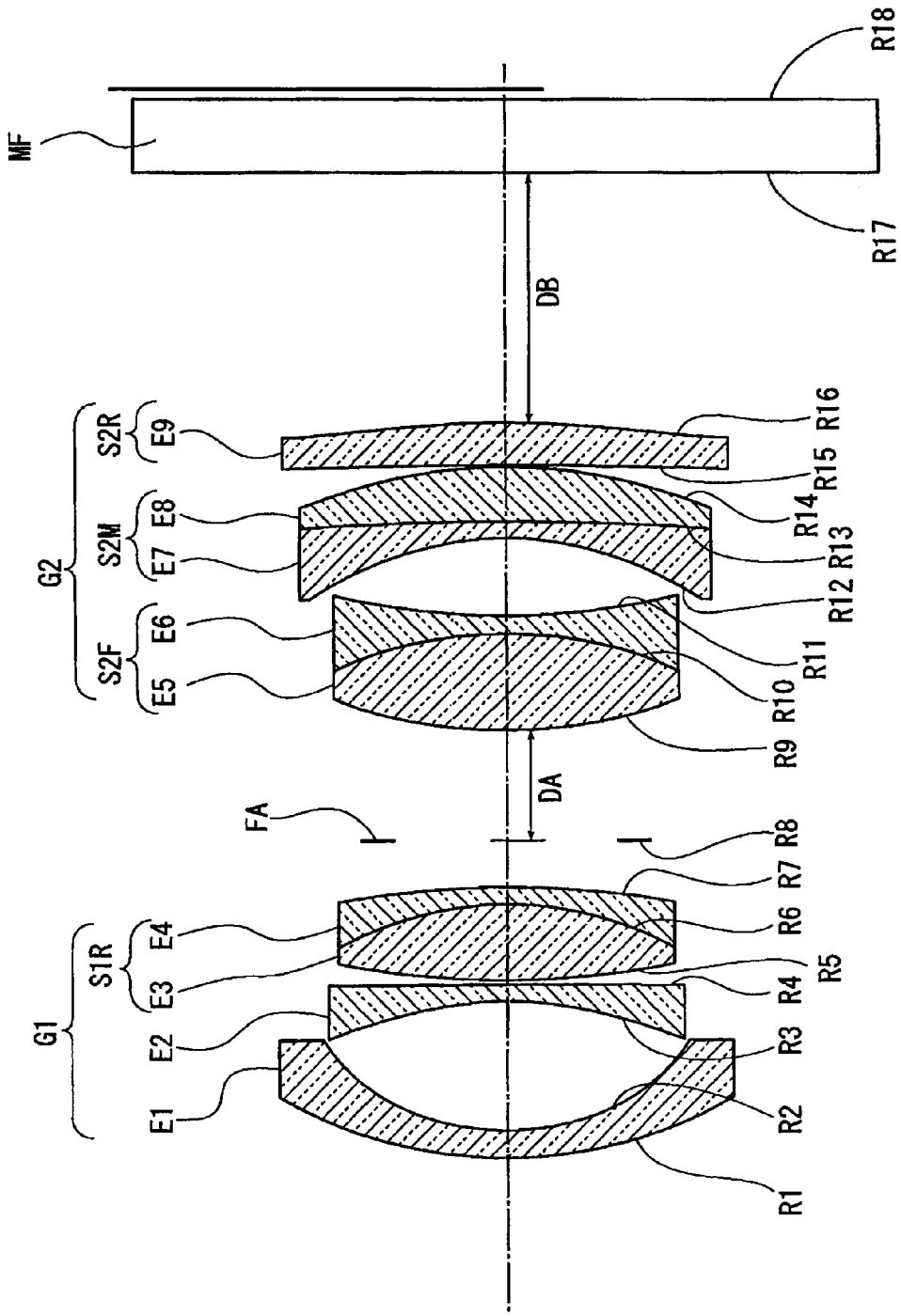
FIG. 16 is a schematic cross-sectional diagram along the optical axis illustrating a constitution of an optical system of an image-forming lens according to Examples 6 of the present invention.

FIG. 16 is a schematic vertical cross-sectional diagram illustrating a constitution of an optical system of an image-forming lens according to Example 6 of the present invention.

An image-forming lens illustrated in FIG. 16 includes, from an object side to an image side in order, a first lens group G1, an aperture FA, and a second lens group G2. The first lens group G1 has a positive refractive power, or is approximately afocal, and the second lens group G2 has a positive refractive power.

The first lens group G1 includes, from the object side to the image side in order, a first negative lens E1, a second negative lens E2, and a first R lens group S1R. A negative lens which has a surface on the image side having a large curvature constitutes the first negative lens E1. A negative lens which has a surface on the object side having a large curvature constitutes the second negative lens E2. A single lens or a cemented lens constitutes the first R lens group S1R having a positive refractive power.

Therefore, an arrangement of the refractive power of the first lens group G1 is "negative, negative, and positive", from the object side to the image side.

The second lens group G2 includes, from the object side to the image side in order: a second F lens group S2F, a second M lens group S2M, and a second R lens group S2R.

A cemented lens of a biconvex lens and a biconcave lens constitutes the second F lens group S2F having a positive refractive power. A single lens or a cemented lens constitutes the second M lens group S2M having a negative refracting power. A positive lens constitutes the second R lens S2R. Therefore, an arrangement of the refractive power of the second lens group G2 is "positive, negative, and positive", from the object side to the image side.

A surface of a lens on a most object side of the second M lens group S2M is a concave surface, and a surface of a lens on a most image side of the second M lens group S2M is a convex surface.

In Example 6, each of a focal length of an entire system f, a smallest f-number F, and a half-field angle ω are as follows.

$f=17.00$ $F=2.55$ $\omega=40.3$

An optical characteristic of each optical element is expressed in the following table.

TABLE 11

| | | | Optical characteristic | | | |
|---|---|---|---|---|---|---|
| SURFACE NUMBER | R | D | $N_d$ | $v_d$ | $P_{g,F}$ | GLASS NAME |
| 1* | 18.933 | 1.20 | 1.67790 | 54.89 | 0.5458 | OHARA L-LAL12 |
| 2* | 9.524 | 5.75 | | | | |
| 3 | −15.521 | 0.80 | 1.49700 | 81.54 | 0.5375 | OHARA S-FPL51 |
| 4 | −323.082 | 0.10 | | | | |
| 5 | 27.191 | 3.42 | 1.88300 | 40.76 | 0.5667 | OHARA S-LAH58 |
| 6 | −12.977 | 0.80 | 1.84666 | 23.78 | 0.6205 | OHARA S-TIH53 |
| 7 | −35.061 | 2.10 | | | | |
| 8 | APERTURE | CHANGEABLE INTERVAL DA | | | | |
| 9 | 18.941 | 4.32 | 1.88300 | 40.76 | 0.5667 | OHARA S-LAH58 |
| 10 | −14.601 | 0.80 | 1.58144 | 40.75 | 0.5774 | OHARA S-TIL25 |
| 11 | 26.050 | 3.46 | | | | |
| 12 | −12.645 | 0.80 | 1.92286 | 18.90 | 0.6495 | OHARA S-NPH2 |
| 13 | −95.230 | 2.39 | 1.88300 | 40.76 | 0.5667 | OHARA S-LAH58 |
| 14 | −20.038 | 0.10 | | | | |
| 15 | −217.934 | 1.97 | 1.86400 | 40.58 | 0.5669 | OHARA L-LAH83 |
| 16* | −28.435 | CHANGEABLE INTERVAL DB | | | | |
| 17 | ∞ | 3.20 | 1.51680 | 64.20 | | FILTER |
| 18 | ∞ | | | | | |

In Table 11, aspheric surfaces expressed by surface numbers with * (asterisk) are, a first surface, a second surface, and a 16th surface, and each aspheric surface parameter in [Expression 12] is as follows.

Aspheric Surface Parameter
Aspheric Surface of the First Surface $K=0.0$ $A_4=1.10688\times10^{-4}$ $A_6=-1.10007\times10^{-6}$ $A_8=5.03927\times10^{-9}$ Aspheric Surface of the Second Surface $K=0.14781$ $A_4=1.27085\times10^{-4}$ $A_6=-1.46445\times10^{-6}$ $A_8=5.59801\times10^{-8}$ $A_{10}=-1.64269\times10^{-9}$ $A_{12}=1.81646\times10^{-11}$ Aspheric Surface of the 16th Surface $K=0.0$ $A_4=1.02477\times10^{-4}$ $A_6=-1.39868\times10^{-7}$ $A_8=1.33655\times10^{-8}$ $A_{10}=-1.43040\times10^{-10}$ $A_{12}=5.99267\times10^{-13}$ The changeable interval DA between the aperture FA and the second lens group G2, and the changeable interval DB between the second lens group G2 and the filter MF are changed as described in the following table, in the case of focusing, in a state of focusing on the object at infinity, and in a state of focusing on the object in the near distance at an imaging magnification of $-\frac{1}{20}\times$.

TABLE 12

| Changeable interval | | |
|---|---|---|
| | INFINITY | $-\frac{1}{20}\times$ |
| DA | 4.850 | 4.540 |
| DB | 11.037 | 11.888 |

Values corresponding to the above-described Conditional expressions 1 to 14 in Example 6 are follows.
Values of Conditional Expressions $L/Y'=3.35$ [1]

$(r_{21}+r_{22})/(r_{21}-r_{22})=-1.101$ [2]

$Bf/Y'=1.038$ [3]

$L_1/L=0.254$ [4]

$f_A/f_1=0.0796$ [5]

$f_{1F}/f_{1R}=-0.832$ [6]

$A_{1F-1R}/L_1=-0.0083$ [7]

$n_d=1.497$ [8]

$v_d=81.5$ [9]

$P_{g,F}-(-0.001802\times v_d+0.6483)=0.0361$ [10]

$(A_{1-2M}-A_{1-2})/(Bf_M-Bf)=0.364$ [11]

$f_{2b}/f_2=-1.914$ [12]

$(r_{2bF}+r_{2bR})/(r_{2bF}-r_{2bR})=-4.42$ [13]

$(n_{d2b}=1.903$ [14]

Figure 17:
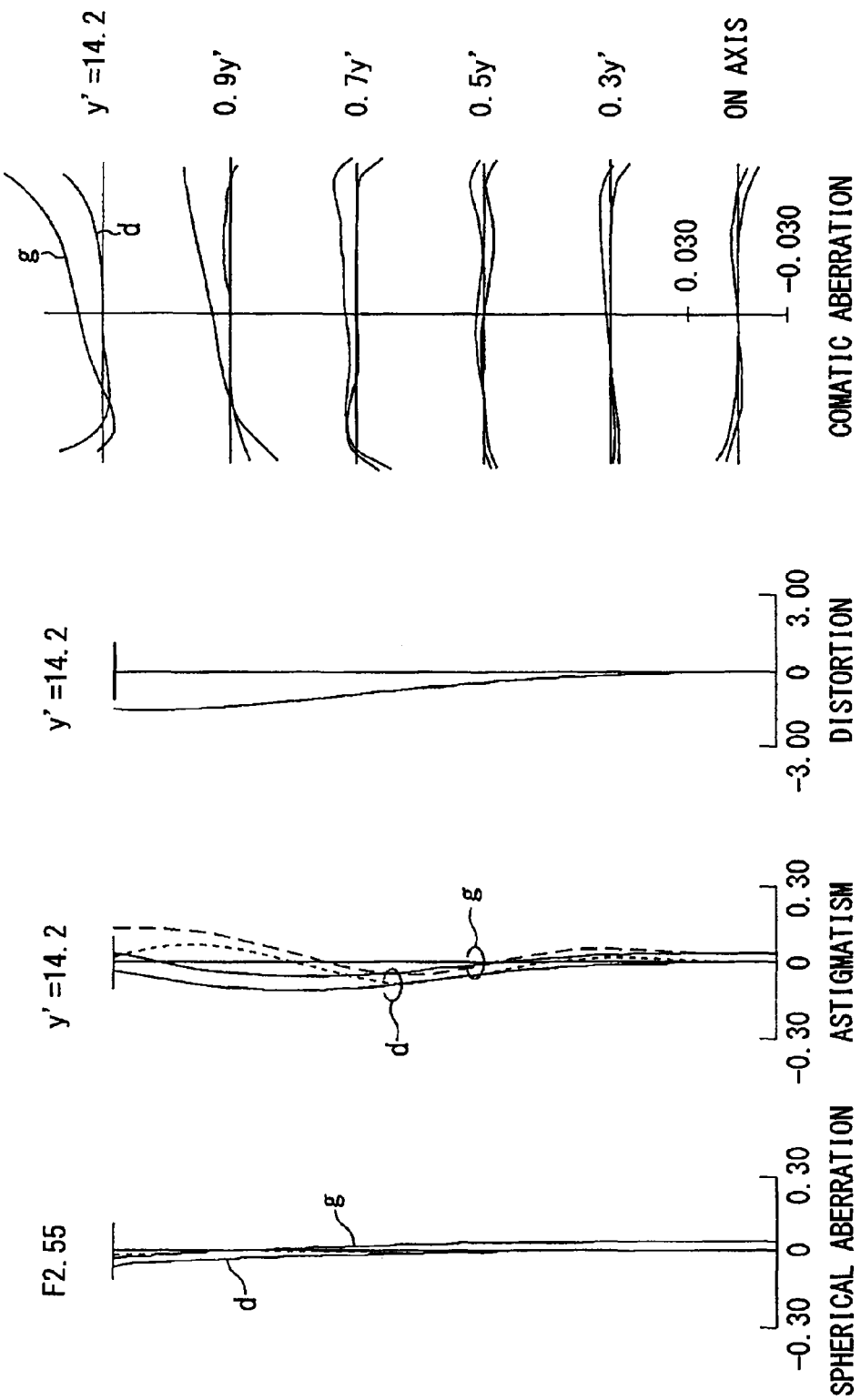
FIG. 17 illustrates aberration diagrams of spherical aberration, astigmatism, distortion, and comatic aberration in a state where the image-forming lens according to Example 6 illustrated in FIG. 13 is focused on an object at infinity.
Figure 18:
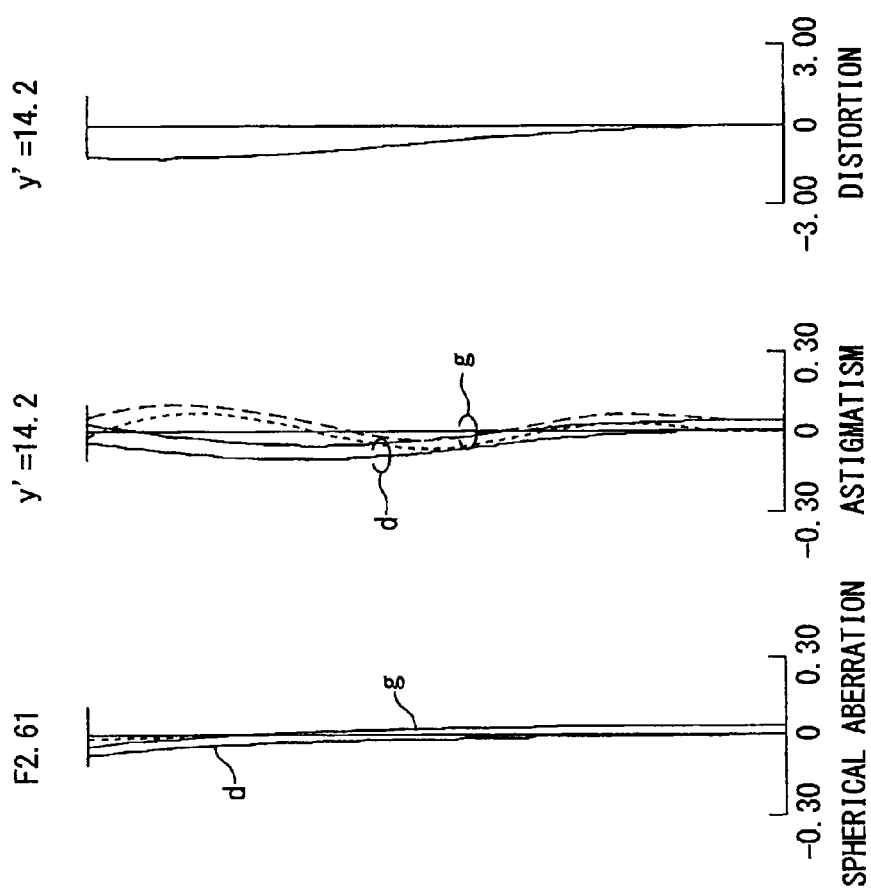
FIG. 18 illustrates aberration diagrams of spherical aberration, astigmatism, distortion, comatic aberration in a state where the image-forming lens according to Example 6 illustrated in FIG. 13 is focused on the object in the near distance at $-\frac{1}{20}\times$.

FIG. 16 illustrates each aberration diagram of spherical aberration, astigmatism, distortion, and comatic aberration in a state where the image-forming lens according to Example 6 is focused on an object at infinity. And FIG. 17 illustrates each aberration diagram of spherical aberration, astigmatism, distortion, comatic aberration in a state where the image-forming lens according to Example 6 is focused on an object in the near distance at $-\frac{1}{20}\times$.

In those aberration diagrams, a dashed-line in a spherical aberration diagram expresses a sine condition, a solid line in an astigmatism diagram expresses astigmatism in a sagittal plane, and a dashed-line in the astigmatism diagram expresses astigmatism in a meridional plane. "g" and "d" in each aberration diagram of spherical aberration, astigmatism, and comatic aberration express a g-line, and a d-line, respectively.

In each example, aberrations are corrected at a high level, and spherical aberration and axial chromatic aberration are so small that they are negligible.

Astigmatism, field curvature, and transverse chromatic aberration are sufficiently small, and comatic aberration and its color difference distortion are favorably suppressed even in a most peripheral part, and distortion also becomes sufficiently small an absolute value of which is less than or equal to 2.0%.

Thus, the image-forming lens according to each example of the present invention is wide-angle and has a large diameter such that a half-field angle is about 38 degrees, and a smallest f-number is less than 2.8, and extremely good optical performance can be maintained.

Example 7

Next, the embodiment of the present invention structuring an imaging apparatus, for example, a digital camera, to which the image-forming lens according to the embodiment of the present invention as described in each of Examples 1 to 6 is applied as an imaging optical system will be explained with reference to FIGS. 19A to 21.

Figure 19A:
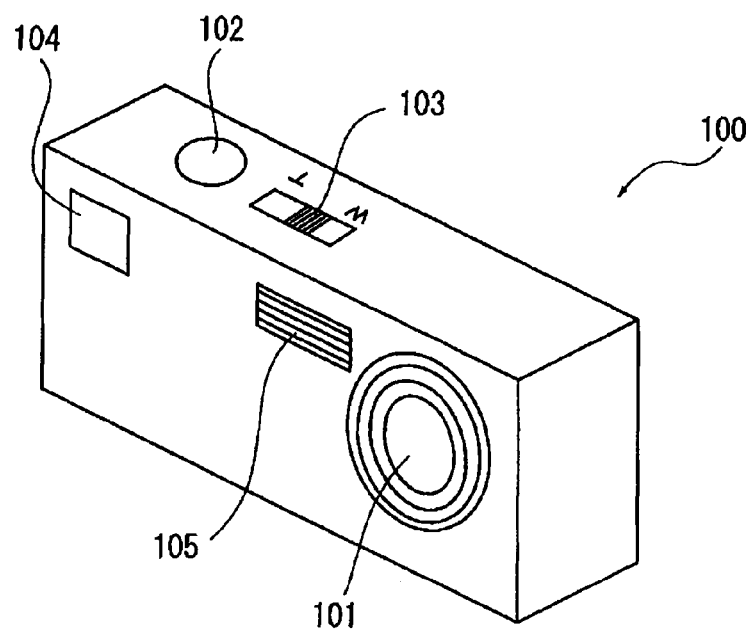
FIGS. 19A and 19B are schematic perspective diagrams seen from an object side illustrating an external constitution of a digital camera as an imaging apparatus according to an embodiment of the present invention.
Figure 19B:
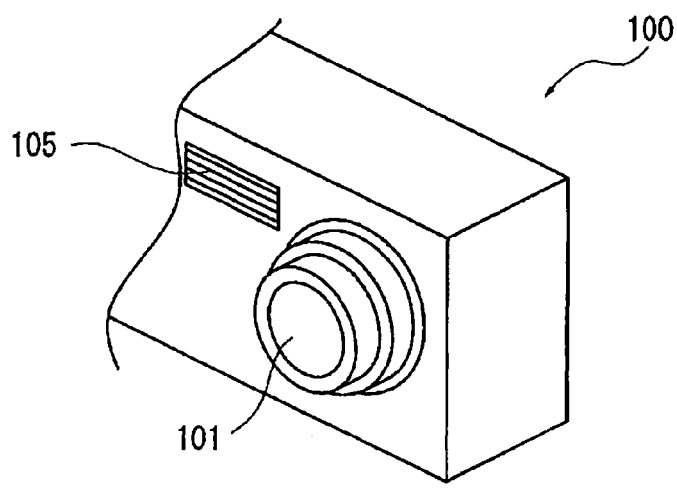
Figure 20:
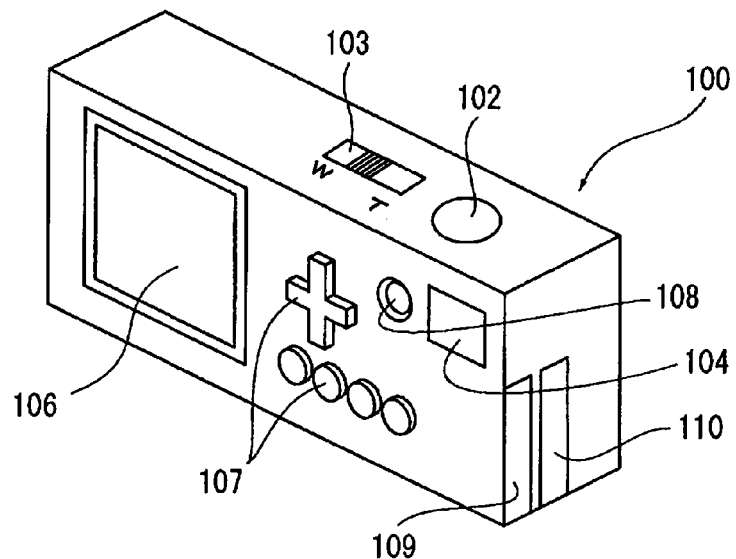
FIG. 20 is a schematic perspective diagram seen from the photographer's side illustrating the external constitution of the digital camera illustrated in FIGS. 19A and 19B.
Figure 21:
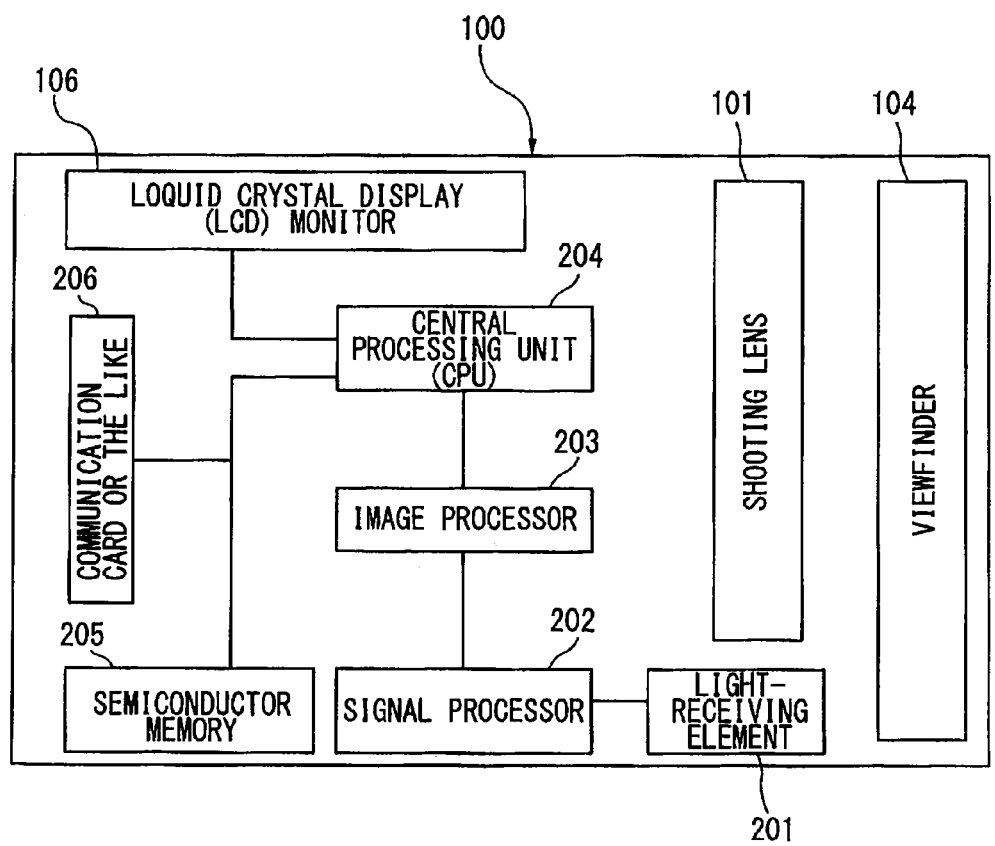
FIG. 21 is a schematic block diagram illustrating a functional constitution of the digital camera illustrated in FIGS. 19A and 19B.

Each of FIGS. 19A and 19B illustrates an external view of a digital camera 100 seen from the front, that is, from a photographic subject side, and FIG. 19A illustrates a state where a shooting lens is collapsed in a body of the imaging apparatus, and FIG. 19B illustrates a state where the shooting lens is extended. FIG. 20 illustrates a perspective external view of the digital camera 100 seen from the back, that is, from a photographer's side. FIG. 21 is a block diagram illustrating a functional constitution of the digital camera 100.

Here, the digital camera 100 as the imaging apparatus is explained; however there are many cases where an imaging function equivalent to the digital camera is mounted, not only in an imaging apparatus mainly exclusive for imaging including a video imaging apparatus, a film imaging apparatus, and so on, but also in a portable information terminal device such as a mobile phone, a PDA (personal data assistant), or the like, and in addition, various information devices including a portable terminal device such as so-called a smartphone having those functions.

External views of those information devices are slightly different from each other; however those information devices include substantially the same function and constitution as the digital camera and the like, in which the image-forming lens according each example of the present invention can be applied.

As illustrated in FIGS. 19A, 19B, and 20, the digital camera 100 includes a shooting lens 101, a shutter button 102, a zoom lever 103, a viewfinder 104, a flash 105, a liquid crystal display (LCD) monitor 106, an operating button 107, a power switch 108, a memory card slot 109, a communication card slot 110, and so on.

Moreover, as illustrated in FIG. 21, the digital camera 100 includes a light-receiving element 201, a signal processor 202, an image processor 203, a central processing unit (CPU) 204, a semiconductor memory 205, and a communication card or the like 206.

The digital camera 100 has the shooting lens 101, and the light-receiving element 201 as an area sensor such as a CMOS (complementary metal-oxide semiconductor) image sensor, a CCD (charge-coupled device) image sensor, or the like. And an image of a photographic target object, that is, an image of a photographic subject formed by the shooting lens 101 as the imaging optical system is received by the light-receiving element 201.

As the shooting lens 101, the image-forming lens according to the embodiment of the present invention as described in each of Examples 1 to 6 is used.

An output of the light-receiving element 201 is converted to digital image data by the signal processor 202 controlled by the CPU 204.

The digital image data converted by the signal processor 202 is recorded in the semiconductor memory 205 which is a nonvolatile memory or the like, after a predetermined image processing is performed in the image processor 203 controlled by the CPU 204.

In this case, the semiconductor memory 205 can be a memory card inserted in the memory card slot 109, or a semiconductor memory built into a body of the digital camera 100.

The LCD monitor 106 displays an image while shooting, and an image stored in the semiconductor memory 205.

The image stored in the semiconductor memory 205 is sent to an external device via the communication card or the like 206 inserted in the communication card slot 110.

As illustrated in FIG. 19A, the shooting lens 101 is collapsed in the body of the digital camera 100, and in a collapsed state, when carrying the digital camera 100. When a user operates the power switch 108 to turn the digital camera 100 on, as illustrated in FIG. 19B, the shooting lens 101 is extended from the body of the digital camera 100.

By operating the zoom lever 103, changing magnification by image processing which changes a trimming area of the image of the photographic subject, so-called digital zoom type zooming, is performed.

In this case, it is preferable that an optical system of the viewfinder 104 also change magnification in cooperation with a change of an effective field angle.

In many cases, focusing is performed by a half-pressing operation of the shutter button 102.

Focusing of the image-forming lens according to the embodiment of the present invention can be performed by a shifting of the entire lens system, but also by a shifting of the light-receiving element 201.

When focusing is performed by the shifting of the entire lens system (or by the shifting of the light-receiving element 201), in a case of focusing on the object in the near distance, the interval between the first lens group G1 and the second lens group G2 is shortened compared with that in a state of focusing on the object at infinity, so that it is possible to cancel a change of field curvature and minimize degradation of optical performance in a limited distance.

Furthermore, focusing can be performed by only a shifting of the second lens group G2.

When the shutter button 102 is further pressed and in a fully-pressed state, shooting is performed, and then the above-described operation is performed.

In a case where the image stored in the semiconductor memory 205 is displayed on the LCD monitor 106, and is sent to the external device via the communication card or the like 206, a predetermined operation is performed by the operating button 107.

The semiconductor memory 205 and the communication card or the like 206 are inserted in an exclusive slot or a general-purpose slot, such as the memory card slot 109 and the communication card slot or the like, and used.

When the shooting lens 101 is in the collapsed state, each lens group of the image-forming lens does not have to be always aligned on the optical axis.

For example, in the case where shooting lens 101 is collapsed, if the second lens group G2 is shifted from the optical axis and stored in parallel with the first lens group G1, it is possible to realize a thinner digital camera.

In the above-described imaging apparatus or information device, as described above, it is possible to use the shooting lens 101 structured by the image-forming lens as described in each of Examples 1 to 6 as the imaging optical system.

Therefore, it is possible to realize a small imaging apparatus or an information device with a high picture quality using a light-receiving element with about 10 to 20 million pixels.

According to embodiments of the present invention, it is possible to achieve an image-forming lens that is wide-angle and has a large diameter such that the half-field angle is about 38 degrees and the smallest f-number is less than 2.8, and is small enough, and sufficiently decreases astigmatism, field curvature, transverse chromatic aberration, a color difference of comatic aberration, distortion and so on, and has a resolution corresponding to an image sensor having 10 million to 20 million pixels, and has no point image distortion in a peripheral part of a field angle at an open aperture, and has high contrast, and does not cause unnecessary coloring in a part where a brightness difference is large, and is capable of drawing a straight line as a straight line without distortion, and an imaging apparatus and an information device using the image-forming lens.

According to an embodiment of the present invention, it is possible to achieve an image-forming lens which is capable of suppressing occurrences of distortion due to asymmetry of a refractive power and transverse chromatic aberration, correcting comatic aberration and a color difference of comatic aberration, and suppressing not to lengthen back focus, and that is small and has a large diameter, and good performance.

According to the embodiment of the present invention, it is possible to be wide-angle and have a large diameter such that the half-field angle is about 38 degrees and the smallest f-number is less than 2.8, and be small enough, and sufficiently decrease astigmatism, field curvature, transverse chromatic aberration, a color difference of comatic aberration, distortion and so on, and have a resolution corresponding to an image sensor having 10 million to 20 million pixels, and have no point image distortion in a peripheral part of a field angle at an open aperture, and have high contrast, and not to cause unnecessary coloring in a part where a brightness difference is large, and draw a straight line as a straight line without distortion, so that it is possible to achieve an image-forming lens that is capable of obtaining high performance and is small and has an extremely high picture quality.

According to the embodiment of the present invention, in particular, it is possible to correct each aberration favorably, and distance an exit pupil position from an image plane sufficiently, and be small and obtain high performance, so that it is possible to achieve an image-forming lens that keeps a light amount in a periphery of a picture and has a high picture quality.

According to the embodiment of the present invention, in particular, it is possible to improve flatness of the image plane, so that it is possible to achieve an image-forming lens having a higher picture quality that has high resolution in an entire picture at an open aperture. And it is possible to balance miniaturization and high performance properly, so that it is possible to achieve an image forming lens that is smaller and has a higher picture quality.

According to the embodiment of the present invention, in particular, it is possible to suppress an occurrence of spherical aberration in accordance with a large diameter, and further obtain high performance, so that it is possible to achieve an image-forming lens that is capable of obtaining a shaper image at the open aperture and has a high picture quality.

According to the embodiment of the present invention, in particular, it is possible to correct chromatic aberration more favorably, and obtain much higher performance, so that it is possible to achieve an image-forming lens that suppresses color shifting and color blurring and has a higher picture quality.

According to the embodiment of the present invention, in particular, it is possible to suppress an occurrence of chromatic aberration and obtain much higher performance, so that it is possible to achieve an image-forming lens that suppresses color shifting and color blurring and has a higher picture quality. And it is possible to suppress a change of optical performance in accordance with focusing on an object placed in a limited distance and be small and obtain high performance, so that it is possible to achieve an image-forming lens that has high resolution in the entire picture in an entire imaging range from infinity to a shortest shooting distance and is small and has a high picture quality.

According to the embodiment of the present invention, in particular, it is possible to further suppress the change of optical performance in accordance with focusing on the object placed in the limited distance and be small and obtain higher performance, so that it is possible to achieve an image-forming lens that has high resolution in the entire picture in the entire imaging range from infinity to the shortest shooting distance and is small and has a higher picture quality.

According to the embodiment of the present invention, it is possible to use an image-forming lens as an imaging optical system of an imaging apparatus that is wide-angle and has a large diameter such that the half-field angle is about 38 degrees and the smallest f-number is less than 2.8, and is small enough, and sufficiently decreases astigmatism, field curvature, transverse chromatic aberration, a color difference of comatic aberration, distortion and so on, and has a resolution corresponding to an image sensor having 10 million to 20 million pixels, and has no point image distortion in a peripheral part of a field angle at an open aperture, and has high contrast, and does not cause unnecessary coloring in a part where a brightness difference is large, and is capable of drawing a straight line as a straight line without distortion, and image an image with a high picture quality, so that it is possible for a user to obtain the image with the high picture quality by the imaging apparatus which is small and good for portability.

According to the embodiment of the present invention, it is possible to use an image-forming lens as an imaging optical system for an imaging function of an information device that is wide-angle and has a large diameter such that the half-field angle is about 38 degrees and the smallest f-number is less than 2.8, and is small enough, and sufficiently decreases astigmatism, field curvature, transverse chromatic aberration, a color difference of comatic aberration, distortion and so on, and has a resolution corresponding to an image sensor having 10 million to 20 million pixels, and has no point image distortion in a peripheral part of a field angle at an open aperture, and has high contrast, and does not cause unnecessary coloring in a part where a brightness difference is large, and is capable of drawing a straight line as a straight line without distortion, and image an image with a high picture quality, so that it is possible for a user to obtain the image with the high picture quality by the information device which is small and good for portability, and send the image to an external device.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An image-forming lens consisting of: from an object side to an image side in the following order,
    a first lens group with a positive refractive power;
    an aperture stop; and
    a second lens group with a positive refractive power, and the second lens group including: from the object side to the image side in the following order, a second F lens group with a positive refractive power in which a biconvex lens and a biconcave lens are cemented to each other; a second M lens group having a concave shape on a surface on a most object side and a convex shape on a surface on a most image side; and a second R lens group of a positive lens,
    wherein an interval between the first lens group and the second lens group in the state of focusing on an object at infinity: $A_{1-2}$, an interval between the first lens group and the second lens group in a case of focusing on an object in a near distance at imaging magnification $-1/20\times$: $A_{1-2M}$, a distance from a surface on the most image side of the second lens group to an image plane in the case of focusing on the object in the near distance at imaging magnification $-1/20\times$: $Bf_M$, and a distance from the surface on the most image side of the second lens group to the image plane in the state of focusing on the object at infinity: $Bf$ satisfy Conditional expression 11:

$$-0.5<(A_{1-2}-A_{1-2})/(Bf_M-Bf)<-0.2.$$

2. The image-forming lens according to claim 1, wherein a distance from a surface on a most object side of the first lens group to an image plane in a state of focusing on an object at infinity: L, and a maximum image height: Y' satisfy Conditional expression 1: $2.8<L/Y'<4.3$.

3. The image-forming lens according to claim 1, wherein a curvature radius of the surface on the most object side of the second M lens group: $r_{2bF}$, and a curvature radius of the surface on the most image side of the second M lens group: $r_{2bR}$ satisfy Conditional expression 13: $-6.0<(r_{2bF}+r_{2bR})/(r_{2bF}-r_{2bf})<-2.0$.

4. The image-forming lens according to claim 1, wherein a distance from the surface on the most image side of the second lens group to an image plane in a state of focusing on an object at infinity: Bf, and a maximum image height: Y' satisfy Conditional expression 3: $0.8<Bf/Y'<1.6$.

5. The image-forming lens according to claim 1, wherein a focal length of an entire lens system: $f_A$, and a focal length of the first lens group: $f_1$ satisfy Conditional expression 5: $0.0 < f_A/f_1 < 0.6$.

6. The image-forming lens according to claim 1, wherein the first lens group includes: a first F lens group with a negative refractive power and a first R lens group with a positive refractive power, and wherein a focal length of the first F lens group: $f_{1F}$, a focal length of the first R lens group: $f_{1R}$ satisfy Conditional expression 6: $-1.3 < f_{1F}/f_{1R} < -0.7$.

7. An imaging apparatus comprising the image-forming lens according to claim 1 as an imaging optical system.

8. An information device having an imaging function comprising the image-forming lens according to claim 1 as an imaging optical system.

9. An imaging apparatus comprising the image-forming lens according to claim 1 as a shooting optical system.

10. An image-forming lens consisting of: from an object side to an image side in the following order,
   a first lens group;
   an aperture stop; and
   a second lens group with a positive refractive power,
   the first lens group including: from the object side to the image side in the following order,
   a first F lens group with a negative refractive power; and
   a first R lens group with a positive refractive power,
   wherein a focal length of the first F lens group: $f_{1F}$, a focal length of the first R lens group: $f_{1R}$ satisfy Conditional expression 6: $-1.3 < f_{1F}/f_{1R} < -0.7$, and
   wherein an interval between the first lens group and the second lens group in a state of focusing on an object at infinity: $A_{1-2}$, an interval between the first lens group and the second lens group in a case of focusing on an object in a near distance at imaging magnification $-1/20\times$: $A_{1-2M}$, a distance from a surface on the most image side of the second lens group to an image plane in the case of focusing on the object in the near distance at imaging magnification $-1/20\times$: $Bf_M$, and a distance from the surface on the most image side of the second lens group to the image plane in the state of focusing on the object at infinity: $Bf$ satisfy Conditional expression 11: $-0.5 < (A_{1-2M} - A_{1-2})/(Bf_M - Bf) < -0.2$.

11. The image-forming lens according to claim 10, wherein in a case of focusing on an object in a near distance, an interval between the first lens group and the second lens group is shorter than that in a state of focusing on an object at infinity.

12. The image-forming lens according to claim 10, wherein a focal length of an entire lens system: $f_A$, and a focal length of the first lens group: $f_1$ satisfy Conditional expression 5: $0.0 < f_A/f_1 < 0.6$.

13. The image-forming lens according to claim 10, wherein a distance from a surface on a most object side of the first lens group to an image plane in a state of focusing on an object at infinity: L, and a maximum image height: Y' satisfy Conditional expression 1: $2.8 < L/Y' < 4.3$.

14. The image-forming lens according to claim 10, wherein the second lens group includes: from the object side to the image side in the following order, a second F lens group with a positive refractive power in which a biconvex lens and a biconcave lens are cemented to each other; a second M lens group having a concave shape on a surface on a most object side and a convex shape on a surface on a most image side; and a second R lens group of a positive lens.

15. The image-forming lens according to claim 14, wherein a curvature radius of the surface on the most object side of the second M lens group: $r_{2bF}$, and a curvature radius of the surface on the most image side of the second M lens group: $r_{2bR}$ satisfy Conditional expression 13: $-6.0 < (r_{2bF} + r_{2bR})/(r_{2bF} - r_{2bR}) < -2.0$.

16. The image-forming lens according to claim 10, wherein a distance from a surface on a most image of the second lens group to an image plane in a state of focusing, on an infinity object: Bf, and a maximum image height: Y' satisfy Conditional expression 3: $0.8 < Bf/Y' < 1.6$.

17. An information device having an imaging function comprising the image-forming lens according to claim 10 as an imaging optical system.

18. An imaging apparatus comprising the image-forming lens according to claim 10 as a shooting optical system.

19. An image-forming lens consisting of: from an object side to an image side in the following order,
   a first lens group with a positive refractive power;
   an aperture stop; and
   a second lens group with a positive refractive power, and
   the second lens group including: from the object side to the image side in the following order, a second F lens group with a positive refractive power in which a biconvex lens and a biconcave lens are cemented to each other; a second M lens group having a concave shape on a surface on a most object side and a convex shape on a surface on a most image side; and a second R lens group of a positive lens,
   wherein in a case of focusing on an object in a near distance, an interval between the first lens group and the second lens group is shorter than that in a state of focusing on an object at infinity, and
   wherein an interval between the first lens group and the second lens group in the state of focusing on the object at infinity: $A_{1-2}$, an interval between the first lens group and the second lens group in a case of focusing on the object in the near distance at imaging magnification $-1/20\times$: $A_{1-2M}$, a distance from a surface on the most image side of the second lens group to an image plane in the case of focusing on the object in the near distance at imaging magnification $-1/20\times$: $Bf_M$, and a distance from the surface on the most image side of the second lens group to the image plane in the state of focusing on the object at infinity: Bf satisfy Conditional expression 11:
   $-0.5 < (A_{1-2M} - A_{1-2})/(Bf_M - Bf) < -0.2$.

* * * * *